(12) United States Patent
Terajima

(10) Patent No.: US 9,350,224 B2
(45) Date of Patent: May 24, 2016

(54) ACTUATOR UNIT

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (CN); HUIZHOU DAYA BAY JSS OPTICAL TECHNOLOGY. CO., LTD., Huizhou (CN)

( * ) Notice: Subject to any disclaimer, the term of this patent is extended or adjusted under 35 U.S.C. 154(b) by 0 days.

(21) Appl. No.: 14/477,905

(22) Filed: Sep. 5, 2014

(65) Prior Publication Data
US 2015/0070792 A1    Mar. 12, 2015

(30) Foreign Application Priority Data
Sep. 10, 2013  (JP) ................................ 2013-187281

(51) Int. Cl.
G02B 7/02    (2006.01)
H02K 41/035  (2006.01)
G02B 7/08    (2006.01)

(52) U.S. Cl.
CPC ............ H02K 41/0356 (2013.01); G02B 7/026 (2013.01); G02B 7/08 (2013.01)

(58) Field of Classification Search
CPC ....... G02B 7/026; G02B 7/08; H02K 41/0356
USPC ......... 359/822–826, 212.1, 221.2, 224.1, 290
See application file for complete search history.

(56) References Cited

U.S. PATENT DOCUMENTS 4,840,457 A * 6/1989 Remer ................. G11B 7/0932
                                          359/824
5,572,372 A * 11/1996 Sekine ..................... G02B 7/08
                                          359/687

* cited by examiner

Primary Examiner — Scott J Sugarman
Assistant Examiner — Vipin Patel
(74) Attorney, Agent, or Firm — Hemisphere Law, PLLC

(57) ABSTRACT

The present invention aims to provide an actuator unit. When the actuator unit is assembled in a lens driving device and works, a lens support beginning to move cannot be inclined. A spring component (14) is provided with an inner side retaining part (14a), an outer side retaining part (14b), a plurality of wrist parts (14c), a plurality of inner side connecting parts (14e), a plurality of outer side connecting parts (14f) and spoke parts (14g) for connecting the inner side retaining part (14a) with the outer side retaining part (14b) in a releasable manner, wherein the lens support (17) is supported by the spring components (14), and an electromagnetic driving mechanism (22) is utilized for enabling the lens support (17) to move.

2 Claims, 15 Drawing Sheets

ACTUATOR UNIT

CROSS-REFERENCE TO RELATED APPLICATIONS

This application claims priority to Japanese patent application No. 2013-187281, filed on Sep. 10, 2013, contents of which are incorporated by reference herein.

BACKGROUND OF THE INVENTION

1. Field of the Invention

The present invention relates to an actuator unit which is mounted on a lens driving device and utilizes an electromagnetic driving mechanism to enable a lens support supported by a spring component in a suspended manner to move.

2. Description of Related Art

FIG. 14A and FIG. 14B are diagrams illustrating an example of an existing voice coil motor type lens driving device 30.

As shown in FIG. 14A, the lens driving device 30 is formed to be box-shaped and is composed of an actuator unit 40, a magnet yoke 32 for storing the unit, and a base 39. The actuator unit 40 arranged on the inner side of the magnet yoke 32 is utilized to enable a lens 31 to move towards the front of Z axis (+Z axis direction) or the back of Z axis (−Z axis direction) as the optical axis, and enable an image of an object positioned in front of the lens 31 to be focused on an image sensor assembled at the back of the lens. As shown in Patent Document 1, JP patent No. 2004-280031 literature, the representative structure of the same lens driving device intimately has been well known.

The actuator unit 40 as shown in FIG. 14B utilizes a lens support 37, an electromagnetic driving mechanism 42 and a spring component 34 to enable the lens 31 to move to a preset position. The spring component 34 is composed of a front side spring component 34A and a back side spring component 34B which are in an approximately same structure. Moreover, the electromagnetic driving mechanism 42 is composed of a coil 38 for driving the lens mounted on the lens support 37 arranged on the moving side and a magnet 35 for driving the lens arranged on the fixed side.

The lens support 37 as shown in FIG. 14B and FIG. 15 is open along the Z axis direction to form a cylinder shape with a circular opening part 37c, and the lens 31 is retained by the inner circumference side of the opening part 37c.

The coil 38 as one component of the electromagnetic driving mechanism 42 is cylindrically wound on the periphery of the lens support 37 around an axis parallel to the Z axis. The magnet 35 as another component of the electromagnetic driving mechanism 42 is formed to be trapezoid column-shaped and is disposed on the outer side of the coil 38 around the axis parallel to the Z axis at a 90-degree interval. The outer circumference side face of the coil 38 and the magnetic pole face of the magnet 35 are disposed opposite to each other at an interval in the radial direction.

A front side magnet support 36A is provided with side walls 36c protruding towards the back of Z axis at central parts of the sides and forms into a square frame-shape with an opening in the Z axis direction. A back side magnet support 36B is provided with an opening in the Z axis direction and forms into a square frame-shape. The magnet 35 is clamped at corners of the square frame by the four sides and the side wall 36c of the front side magnet support 36A and the four sides of the back side magnet support 36B.

Inner side retaining parts 34a of the front side spring component 34A and the back side spring component 34B are respectively connected to a front side connecting end 37a arranged in front of the lens support 37 in the Z axis direction and a back side connecting end 37b arranged at the back of the lens support 37, and outer side retaining parts 34b of the front side spring component 34A and the back side spring component 34B are respectively connected to the front side end part 36a of the front side magnet support 36A and the back side end part 36b of the back side magnet support 36B. Therefore, the actuator unit 40 is formed.

When the coil 38 of the actuator unit 40 is electrified, the coil 38 generates Lorentz force in the +Z axis direction, and the lens support 37 is moved to a position balanced with restoring force of the spring component 34. Therefore, the lens 31 retained on the lens support 37 can move to the preset position in the Z axis direction.

As mentioned above, the actuator unit 40 is retained on the +Z side and the −Z side by the magnet yoke 32 and the base 39, and is assembled in the lens driving device 30.

The magnet yoke 32 is formed into a box shape by side faces 32a arranged in front of the actuator unit 40 and formed by four surfaces parallel to the Z axis and a top surface 32b prolonged from the +Z side end part of the side faces 32a to the inner radial direction and provided with an opening part 32c at the central part, and the magnet yoke 32 covers the front part and the side faces of the actuator unit 40. The magnet yoke 32 is used for improving the magnetic intensity generated onto the coil 38 from the magnet 35, and shielding electromagnetic waves emitted out from the coil 38 or the unshown image sensor.

The base 39 is arranged at the back of the actuator unit 40, and includes: a plate-shaped base plate 39b, a frame-shaped side wall 39c vertically arranged from the outer edge of the base plate 39b in the +Z axis direction, a deep digging part 39d formed by deep digging from the inner radial side of the base plate 39b to the back of the Z axis direction, a circular ring-shaped limiting part 39e which is protruding from the inner edge of the deep digging part 39d to the side of the lens support 37 and abuts against the back side end part 37e of the lens support 37 when the coil 38 is not electrified so as to limit the lens support 37 at the backmost position, and a circular opening part 39a which is formed in the inner edge of the limiting part 39e and faces to the Z axis direction.

As shown in FIG. 14B and FIG. 16A, the spring component 34 is integrally formed by the following components: a circular ring-shaped inner side retaining part 34a connected to the lens support 37; a square frame-shaped outer side retaining part 36b connected to the magnet 35; a plurality of wrist parts 34c disposed between the inner side retaining part 34a and the outer side retaining part 34b and provided with a bending part 34d at the central part; a plurality of inner side connecting parts 34e for connecting the inner side retaining part 34a with one ends of wrist part 34c; a plurality of outer side connecting parts 34f for connecting the outer side retaining part 34b with the other ends of the wrist parts 34c.

When each wrist part 34c is observed from the +Z side, the writ part is prolonged anticlockwise (or anti-anticlockwise) along the peripheral direction from the inner side retaining part 34a through the inner side connecting part 34e, and is connected with the outer side retaining part 34b through the outer side connecting part 34f. These wrist parts 34c is taken as a spring for suspending the lens support 37 in the actuator unit 40 to take effect.

In the lens driving device 30, a square frame-shaped fixed ring 33 (reference to FIG. 15) is inserted into the inner side of the magnet yoke 32 from the −Z side. Moreover, the actuator unit 40 is inserted in the −Z side of the fixed ring 33, and the outer side retaining part 34b is clamped by the top surface 32b of the magnet yoke 32 and the front side end part 36a of the front side magnet support 36A with the help of the fixed ring 33. The actuator unit 40 is inserted in the inner side of the side wall 39c of the base 39 pressed from the −Z side, and the outer side retaining part 34b of the back side spring component 34B is clamped by the base plate 39b of the base 39 and the back side end part 36b of the back side magnet support 36B.

Finally, the lens is mounted in the lens support 37, and the lens driving device 30 is assembled. The unshown image sensor assembled on the −Z side of the assembled lens driving device 30 is taken as an auto focus camera, and is assembled in a cellular phone for instance.

However, the spring component 34 is formed by thin and narrow panel, and thus the wrist parts 34c are likely to be deformed in the Z axis direction taken as the running direction, and are likely to be subjected to micro external force as shown in FIG. 16B so as to be deformed in the directions orthogonal to the Z axis (X axis direction, Y axis direction).

Before the spring component 34 as shown in FIG. 16A is assembled, the spring component 34 is not subjected to external force, the outer side retaining part 34b and the inner side retaining part 34a of which cannot exist a position offset, so the center P1 of the outer side retaining part 34b and the center P2 of the inner side retaining part 34a can keep consistent with each other. However, as shown in FIG. 16B, for example, when the inner side retaining part 34a is just subjected to micro force in the direction orthogonal to the Z axis, the wrist parts 34c are likely to be distorted (deformed) in the direction orthogonal to the Z axis, and the center P2 of the inner side retaining part 34a and the center P1 of the outer side retaining part 34b may exist an offset. In the working procedure that the spring component 34 is connected, the wrist parts 34c are likely to be distorted in the direction (X axis direction, Y axis direction) orthogonal to the Z axis, which results in that the assembled lens driving device 30 is inclined during running.

Namely, in the lens driving device 30, wrist parts 34c of the front side spring component 34A or the back side spring component 34B are assembled in the actuator unit 40 at the state of being distorted in the direction orthogonal to the Z axis. When the coil 38 is electrified so as to enable the lens support 37 to begin to move forwards in the Z axis direction, the lens support 37 may be twisted around the axis forming a right angle with the Z axis, and the optical axis of the lens 31 is inclined.

Hereon, refer to the FIGS. 17A, 17B, 17C and 17D, the assembling working procedure and inclination of the actuator unit 40 are described in detail. During the assembling of the actuator unit 40, a back side spring component mounting clamp 41B, a front side spring component mounting clamp 41A and a centering clamp 41C are used.

The back side spring component mounting clamp 41B is plate-shaped, and the central part of which is provided with an opening part 41c for the centering clamp 41C to detachably buckle. And for the sake of positioning, the back side spring component mounting clamp 41B includes: a first deep digging part 41d and a second deep digging part 41e. The first deep digging part 41d is processed to be corresponding to the shape and the size of the front side magnet support 36A so that the front side magnet support 36A can be inserted in the first deep digging part 41d. The second deep digging part 41e is processed to be corresponding to the shape and the size of the lens support 37 and is processed with an appropriate depth.

The front side spring component mounting clamp 41A is plate-shaped, and the central part of which is provided with an opening part 41a for the centering clamp 41C to detachably buckle, and the front side spring component mounting clamp 41A is also provided with a third deep digging part 41b for positioning, which is processed to be corresponding to the shape and the size of the back side magnet support 36B so that the back side magnet support 36B can be inserted in the third deep digging part 41b. The centering clamp 41C is column-shaped, and is processed to be corresponding to the shape and the size of the inner wall 37d of the lens support 37 and the inner wall 37d of the lens support 37d can be inserted in the centering clamp 41C.

The assembling working procedure of the actuator unit 40 includes: the working procedure for connecting the back side spring component 34B onto the lens support 37 and the back side magnet support 36B; and the working procedure for respectively connecting the front side spring component 34A onto the lens support 37 and the front side magnet support 36A.

Namely, as shown in FIG. 17A, the first deep digging part 41d and the second deep digging part 41e are respectively aligned to the opening part 41c of the back side spring component mounting clamp 41B facing to the −Z side and the +Z side end part of the centering clamp 41C mutually. Moreover, the centering clamp 41C is inserted into the inner wall 37d of the lens support 37 wound with the coil 38 from the −Z side end part, the front side end part of the lens support 37 abuts against the second deep digging part 41e of the back side spring component mounting clamp 41B, and the front side magnet support 36A abuts against the first deep digging part 41d of the back side spring component mounting clamp 41B. In this way, the centering clamp 41C is utilized for the positioning of the lens support 37 in the diameter direction, and the second deep digging part 41e of the back side spring component mounting clamp 41B is utilized for the positioning of the lens support 37 in the Z axis direction, and the first deep digging part 41d is utilized for the positioning of the front side magnet support 36A in the diameter direction and the Z axis direction.

And then, after the magnet 35 and the back side magnet support 36B are overlapped in sequence on the −Z side of the front side magnet support 36A so as to be connected with each other, the inner side retaining part 34a of the back side spring component 34B is connected to the back side connecting end 37b of the lens support 37, and the outer side retaining part 34b is connected to the back side end part 36b of the back side magnet support 36B.

Then, as shown in FIG. 17B, in the state that the back side spring component 34B, the lens support 37, the front side magnet support 36A, the magnet 35 and the back side magnet support 36B are connected mutually and mounted on the centering clamp 41C, the back side spring component mounting clamp 41B is demounted from the centering clamp 41C. Moreover, the third deep digging part 41b is respectively embedded with the opening part 41a of the front side spring component mounting clamp 41A facing to the +Z side and the −Z side end part of the centering clamp 41C, and the back side magnet support 36B abuts against the third deep digging part 41b of the front side spring component mounting clamp 41A. Thereafter, the front side spring component 34A is respectively disposed on the +Z sides of the lens support 37 and the front side magnet support 36A, so that the inner side retaining part 34a of the front side spring component 34A is connected with the front side connecting end 37a of the lens support 37, and the outer side retaining part 36b of the front side spring component 34A is connected with the front side end part 36a of the front side magnet support 36A.

Then, as shown in FIG. 17C, the front side spring component mounting clamp 41A and the centering clamp 41C are dismounted from the assembled actuator unit 40.

At an embedding part between the centering clamp 41C for assembling the actuator unit 40 and the front side spring component mounting clamp 41A or the back side spring component mounting clamp 41B, loosening is easily occurred between the clamps for errors of machining dimension and the like, and loosening is also easily occurred between the clamp and the component for the dimensional deviation of each component such as the lens support 37.

Therefore, for example, under the condition that the gap between the inner wall 37d of the lens support 37 and the outer diameter of the centering clamp 41C is large, during the process of converting the working procedure of connecting the back side spring component 34B as shown in FIG. 17A to the working procedure of connecting the front side spring component 34A as shown in FIG. 17B, the lens support 37 connected with the inner side retaining part 34a may be inclined toward the direction (X-axis direction, Y-axis direction) orthogonal to the Z axis, or the back side magnet support 36B connected with the outer side retaining part 34b may be inclined toward the direction (X-axis direction, Y-axis direction) orthogonal to the Z axis, or the wrist parts 34c of the back side spring component 34B may be distorted in the direction orthogonal to the Z axis.

In the state that the wrist parts 34c of the back side spring component 34B are distorted, while the front side spring component 34A is respectively connected with the lens support 37 and the front side magnet support 36A, the wrist parts 34c of the back side spring component 34B in the actuator unit 40 still keep at a distorted state. Therefore, when the centering clamp 41C and the front side spring component mounting clamp 41A are dismounted to enable the lens support 37 to be at a freely suspended state, the stress generated by the wrist parts 34c of the back side spring component 34B is also transmitted to the wrist parts 34c of the front side spring component 34A.

As a result, as shown in FIG. 17C, the lens support 37 is twisted around the axis forming straight angle with the Z axis as shown in a rotating arrow R, until the stress integrally generated by the wrist parts 34c of the front side spring component 34A and the back side spring component 34B achieves a balanced angle.

As mentioned above, the base 39 is mounted at the back of the actuator unit 40 in the lens driving device, the back side magnet support 36B is fixed on the base 39, and the back side end part 37e of the lens support 37 abuts against the front end of the limiting part 39e of the base 39 and the lens support 37 is supported in the state of being subjected to the offset towards the front of the Z axis direction.

Therefore, as shown in FIG. 17D, when the back side end part 37e of the lens support 37 abuts against the limiting part 39e so as to be positioned at the backmost position, even if the lens support lens 37 is suspended distortedly on the actuator unit 40, the lens support 37 cannot be distorted, and will stay toward the Z axis direction.

However, when the coil 38 operates to enable the lens support 37 to move forwards in front of the Z axis and to enable the back side end part 37e to deviate from the limiting part 39e, the spring component 34 forms a twisted state as shown in FIG. 17C again, and the suspended lens support 37 is inclined.

When the actuator unit 40 is assembled in the lens driving device 30, the lens support 37 can be inclined during auto focus, and thus the lens 31 retained on the lens support 37 may be inclined. The image focused on the image sensor is twisted for the inclined lens 31, which leads to color permeation or dimming, and the problem of image quality degradation such as image stress.

BRIEF SUMMARY OF THE INVENTION

The present invention is provided in view of existing problems, and aims to provide an actuator unit, wherein the lens support which begins to move cannot be inclined when the actuator unit is assembled in a lens driving device to be operated.

The present invention is an actuator unit. The actuator unit is provided with an electromagnetic driving mechanism for enabling a lens support to move in the direction of the lens optical axis; the lens support can move a spring component supported in a suspended manner; the spring component is formed to be provided with an inner side retaining part connected to the moving side, an outer side retaining part connected to the fixed side, a plurality of wrist parts disposed between the inner side retaining part and the outer side retaining part, an inner side connecting part which is prolonged from the inner side retaining part to the wrist parts and is used for connecting one end of each wrist part with the inner side retaining part, an outer side connecting part which is prolonged from the outer side retaining part to the wrist parts and is used for connecting the other ends of the wrist parts with the outer side retaining part, and a spoke part for connecting the inner side retaining part with the outer side retaining part in a releasable manner.

Therefore, when the actuator unit is assembled, mutual position relation between the inner side retaining part and the outer side retaining part of the spring component can remain accurately, and thus the wrist parts cannot be distorted; the twisted suspension of the lens support cannot occur, and thus the actuator unit which is assembled in the lens driving device and cannot be inclined when the lens support moves can be provided.

Moreover, the present invention is characterized in that the spoke part is composed of first spoke parts and second spoke parts, one end of each first spoke part is connected with the inner side retaining part, one end of each second spoke part is connected with the outer side retaining part, and the other ends of the first spoke parts and the other ends of the second spokes part are mutually connected together on the outer side of the outer side retaining part.

In this way, if the spoke part is divided into the first spoke parts of which one end is connected with the inner side retaining part and the second spoke parts of which one end is connected with the outer side retaining part, the other ends of the first spoke parts and the second spoke parts are mutually connected together on the outer side of the outer side retaining part, the inner side retaining part and the outer side retaining part can be mutually separated easily, and the assembling working procedure of the actuator unit becomes simple.

Moreover, the summary of the invention does not list all features required by the present invention, and auxiliary combination of these features also can become the present invention.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

The present invention is described through the embodiments as follows, the following embodiments do not limit claims in the present invention, and the combination of all features described in the embodiments does not necessary for solutions of the present invention.

Figure 1A:
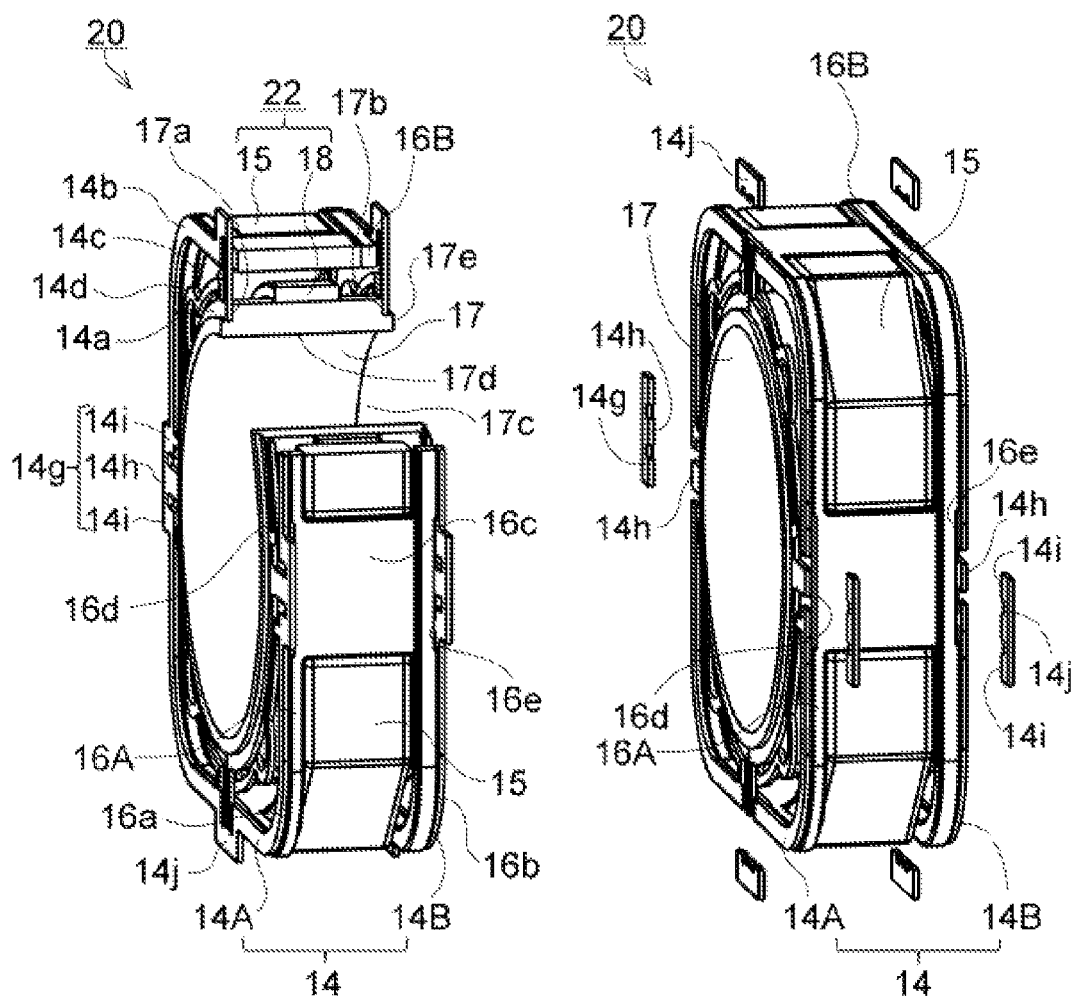
FIG. 1A and FIG. 1B are perspective views of an actuator unit in according to an embodiment of the present invention.
Figure 1A:
Figure 1B:
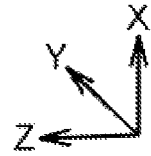
Figure 2:
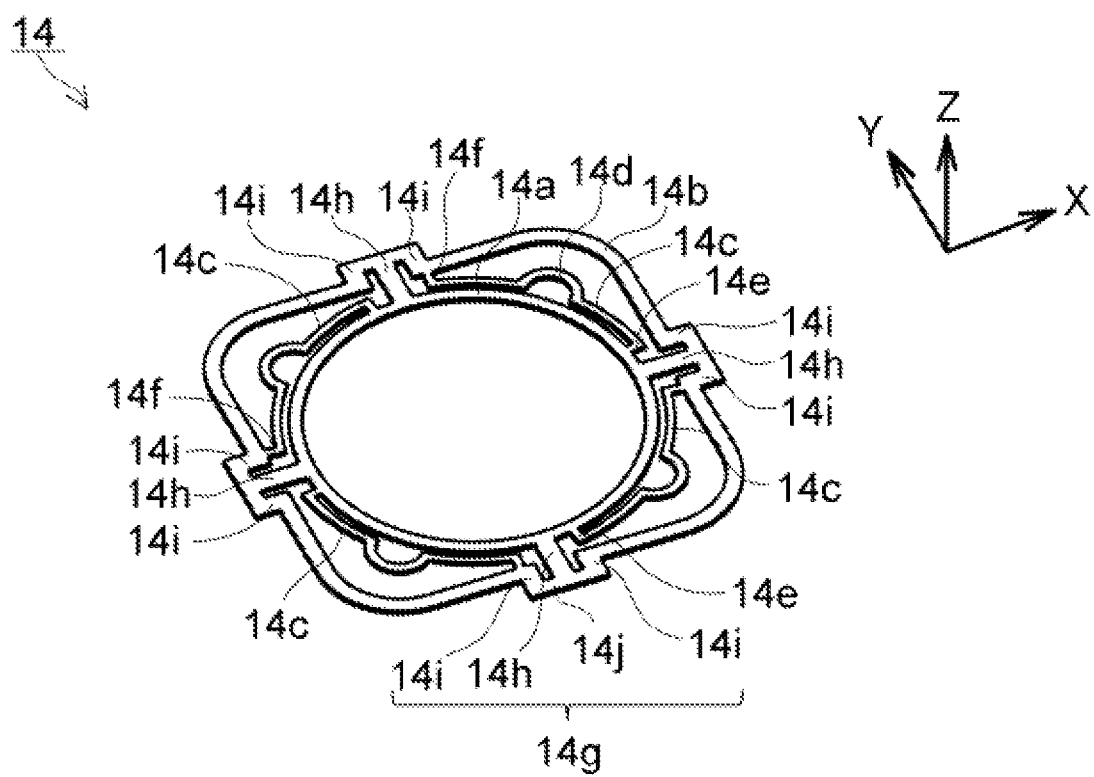
FIG. 2 is a perspective view of a spring component of the actuator unit of an embodiment of the present invention.
Figure 3:
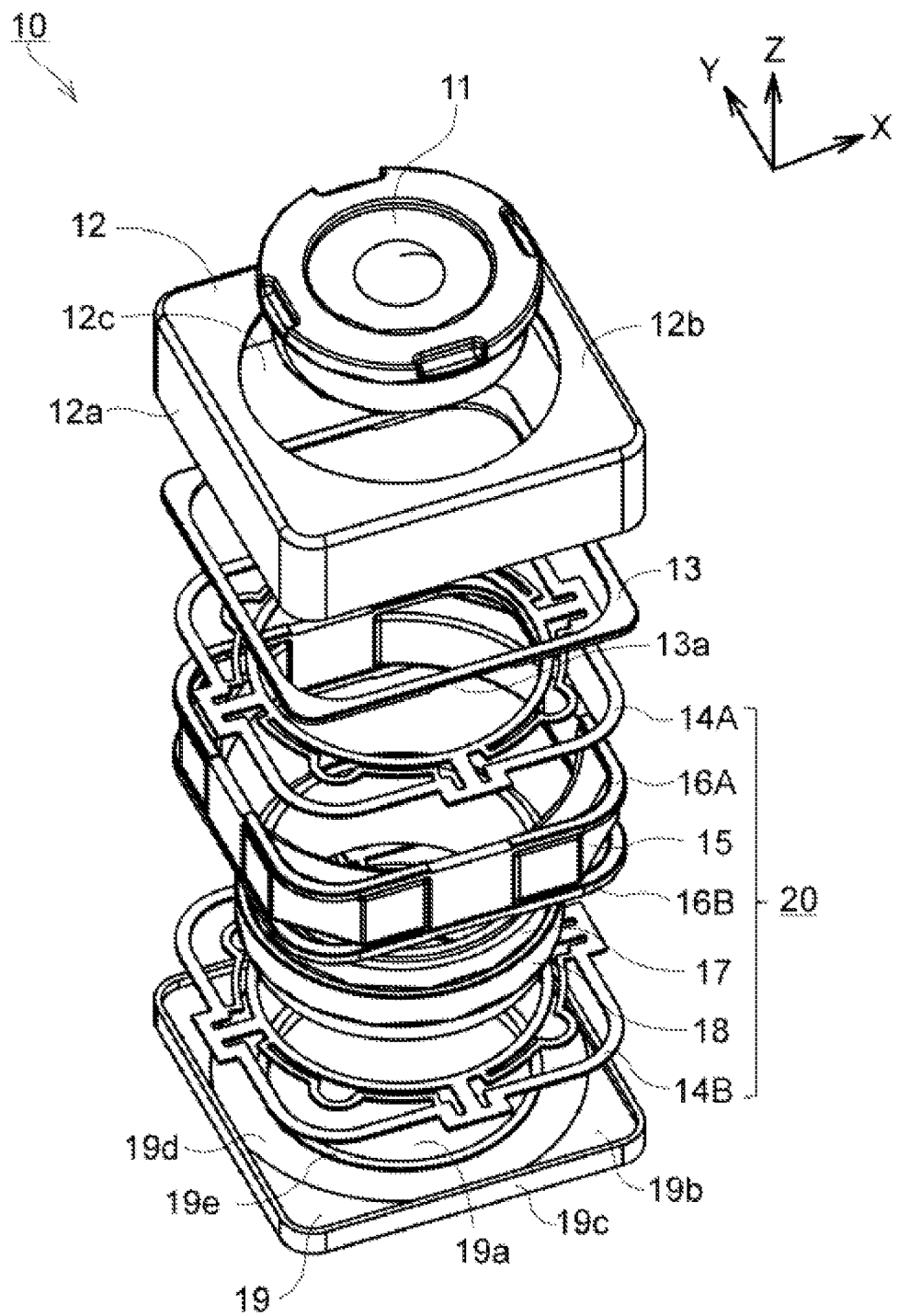
FIG. 3 is an exploded view of a lens driving device assembled with the actuator unit of an embodiment of the present invention.

FIG. 1A and FIG. 1B are respectively perspective views illustrating an actuator unit 20 in according to a first embodiment of the present invention. FIG. 2 is a perspective view of a spring component 14, FIG. 3 is an exploded view of a lens driving device 10 assembled with the actuator unit 20 of the embodiment. FIG. 4A to FIG. 4D are cross-sectional views illustrating one example of the assembling working procedure of the actuator unit 20.

Moreover, in the Specification, the Z-axis direction is taken as the optical axis direction of a lens 11, the side of an object is taken as the front of Z axis (hereinafter called +Z-axis direction, in front of or in the front of Z axis, and also called +Z side), and the side opposite to the side of the object is taken as the back of Z axis (hereinafter called −Z-axis direction, at the back of +Z axis, and also called −Z side). Moreover, two axes which are orthogonal to the Z axis and mutually orthogonal are taken as X axis and Y axis. Moreover, as shown in FIG. 1A, in order to observe the interior of the actuator unit 20 easily, a part of the actuator unit is cut off.

As shown in FIG. 1A, the actuator unit 20 includes a lens support 17, an electromagnetic driving mechanism 22 and two spring components 14.

The lens support 17 is cylindrical, and defines an opening part 17c which is open along the Z-axis direction. The lens support 17 is used for retaining the lens 11 on the inner side of the opening part 17c, and is supported by the spring components 14 in a suspended manner to be capable of moving.

Moreover, the electromagnetic driving mechanism 22 includes a coil 18 and four magnets 15 the lens. The coil 18 is arranged on a moving side and mounted on the lens support 17. The magnets 15 are arranged on a fixed side.

The coil 18 as one component of the electromagnetic driving mechanism 22 is cylindrically wound on the periphery of the lens support 17 around an axis parallel to the Z axis. The four magnets 15 as another component of the electromagnetic driving mechanism 22 are trapezoid column-shaped and are disposed on the outer side of the coil 18 around the axis parallel to the Z axis at a 90-degree interval, and the outer circumference side face of the coil 18 and the magnetic pole faces of the magnets 15 are disposed opposite to each other at an interval in the radiation direction. Moreover, the magnets 15 are clamped at corners of a square frame formed by four edges and the side walls 16c of a front side magnet support 16A and four sides of a back side magnet support 16B as described below.

As shown in FIG. 1 and FIG. 2, the two spring components 14 are a front side spring component 14A and a back side spring component 14B of an approximately same structure. Moreover, in the following description, under the condition that the front side spring component 14A and the back side spring component 14B do not need to be distinguished, the front side spring component 14A and the back side spring component 14B are called "spring components 14" in general.

Each spring component 14 is a component integrally formed through etching, and is provided with a circular ring-shaped inner side retaining part 14a connected to the lens support 37, a square frame-shaped outer side retaining part 14b connected to the magnets 15, a plurality of wrist parts 14c disposed between the inner side retaining part 14a and the outer side retaining part 14b and each provided with a bending part 14d at a central part, a plurality of inner side connecting parts 14e for connecting the inner side retaining part 14a with one ends of the wrist parts 14c, a plurality of outer side connecting parts 14f for connecting the outer side retaining part 14b with the other ends of the wrist parts 14c, and a plurality of spoke parts 14g for connecting the inner side retaining part 14a with the outer side retaining part 14b mutually.

Each spoke part 14g includes a first spoke part 14h prolonged from the inner side retaining part 14a along the radical direction radially, two second spoke parts 14i which are prolonged and parallel from the outer side retaining part 14 along the radial direction radially on the two sides of the first spoke part 14h, and a connecting piece 14j which is prolonged in a direction orthogonal to the first spoke part 14h and the second spoke parts 14i and is used for connecting the first spoke part 14h and the two second spoke parts 14i mutually.

Moreover, in the embodiment, the spring component 14 as shown is set to include four wrist parts 14c arranged at 90-degree intervals around the axis parallel to the Z axis, but is not limited to this, and at least two or more wrist parts 14c are arranged. Moreover, there are illustrated to be four spoke parts 14g arranged at 90-degree intervals around the axis parallel to the Z axis, but an approximate and necessary amount of the spoke parts 14g accords with the structure of the spring component 14.

As shown in FIG. 1 and FIG. 3, the inner side retaining part 14a of the front side spring component 14A and the inner side retaining part 14a of the back side spring component 14B are respectively connected onto the front side connecting end 17a arranged in front of the Z-axis direction of the lens support 17 and the back side connecting end 17b arranged at the back of the lens support 17. The outer side retaining part 14b of the front side spring component 14A and the outer side retaining part 14b of the back side spring component 14B are respectively connected onto the front side end part 16a of the front side magnet support 16A and the back side end part 16b of the back side magnet support 16B.

The front side magnet support 16A is formed into the shape of a square frame with an opening in the Z-axis direction, and a side wall 16c projected backwards in the Z-axis direction is arranged at the central part of each edge of the square frame. The back side magnet support 16B is formed to be the shape of a square frame provided with an opening in the Z-axis direction.

A plurality of concave parts 16d which are concave backwards in the Z-axis direction are formed on the parts, abutting against the spoke parts 14g of the front side spring component 14A, of the front side end part 16a of the front side magnet support 16A. A plurality of concave parts 16e which are concave forwards in the Z-axis direction is formed on the parts, abutting against the spoke parts 14g of the front side spring component 14B, of the back side end part 16b of the back side magnet support 16B. The reason of setting the concave parts is that at least first spoke parts 14h of the front side spring component 14A and the back side spring component 14B cannot be contacted with the front side end part 16a and the back side end part 16b when the outer side retaining parts 14b of the front side spring component 14A and the back side spring component 14B are respectively connected with the front side part 16a of the front side magnet support 16A and the back side end part 16b of the back side magnet support 16B.

As shown in FIG. 4A, FIG. 4B, FIG. 4C and FIG. 4D, the actuator unit 20 is composed of the following components: the lens support 17, the coil 18, the front side spring component 14A, the back side spring component 14B, the magnet 15, the front side magnet support 16A and the back side magnet support 16B for clamping the magnet 15.

Moreover, the actuator unit 20 is assembled by using a front side spring component mounting clamp 21A, a back side spring component mounting clamp 21B and a centering clamp 21C which are matched with the shape and the size of the back side magnet support 16B.

The front side spring component mounting clamp 21A is plate-shaped, and is provided with an opening part 21a for the centering clamp 21C to detachably match in the central part of the front side spring component mounting clamp 21A. The front side spring component mounting clamp 21A is provided with a third deep digging part 21b for positioning, wherein the third deep digging part 21b corresponds to the shape and the size of the back side magnet support 16B so that the insertable third deep digging part is processed.

The back side spring component mounting clamp 21B is plate-shaped, and is provided with an opening part 21c for the centering clamp 21C to detachably match in the central part of the back side spring component mounting clamp 21B. For the sake of positioning, the back side spring component mounting clamp 21B is provided with a first deep digging part 21d and a second deep digging part 21e, wherein the first deep digging part 21d corresponds to the shape and the size of the front side magnet support 16A so that the front side magnet support 16A can be inserted in the first deep digging part 21d; and the second deep digging part 21e corresponds to the shape and the size of the lens support 17 so that an appropriate depth is processed.

The centering clamp 21C is a cylinder which corresponds to the shape and the size of an inner wall 17d of the lens support 17 so as to be processed to be prolonged along the Z-axis direction, and can be inserted in the lens support 17.

Then, the assembling working procedure of the actuator unit 20 using the clamps 21A, 21B and 21C is described.

The assembling working procedure of the actuator unit 20 generally includes the following steps: connecting the back side spring component 14B onto the lens support 17 and the back side magnet support 16B, and connecting the front side spring component 14A onto the lens support 17 and the front side magnet support 16A.

Figure 4A:
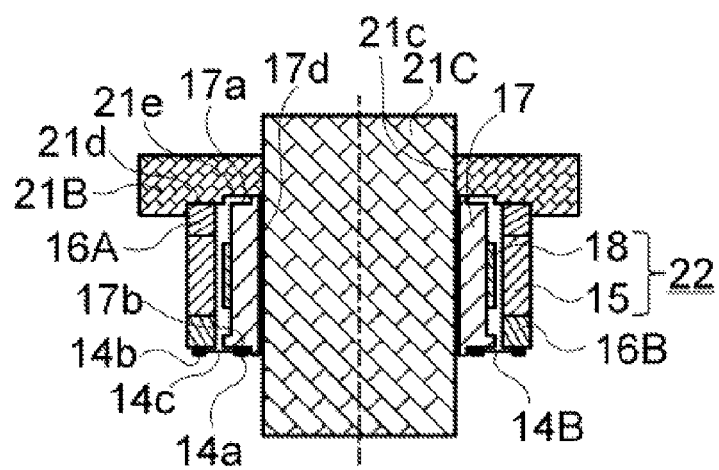
FIG. 4A to FIG. 4D are cross-sectional views illustrating an assembling working procedure of the actuator unit of an embodiment of the present invention.

Firstly, as shown in FIG. 4A, at the state that the first deep digging part 21d and the second deep digging part 21e face to the −Z side, the +Z side end part of the centering clamp 21C and the opening part 21c of the back side spring component mounting clamp 21B are aligned to each other.

Then, the centering clamp 21C is inserted within the inner wall 17d of the lens support 17 wound with the coil 18 from the −Z side end part of the lens support 17, the front side end part of the lens support 17 abuts against the bottom surface of the second deep digging part 21e of the back side spring component mounting clamp 21B, the front side magnet support 16A is inserted in the first deep digging part 21d of the back side spring component mounting clamp 21B, and the front side end part 16a abuts against the bottom surface of the first deep digging part 21d. Then, the lens support 17 is positioned in the diameter direction and the Z-axis direction and the front side magnet support 16A is positioned in the diameter direction and the Z-axis direction.

In addition, the magnets 15 and the back side magnet support 16B are stacked on the −Z side of the front side magnet support 16A in sequence so as to be connected in the manner that the magnets 15 are clamped. Thereafter, the back side spring component 14B is disposed on the −Z sides of the lens support 17 and the back side magnet support 16B, the inner side retaining part 14a is connected to the back side connecting end 17b of the lens support 17, and the outer side retaining part 14b is connected to the back side end part 16b of the back side magnet support 16B.

Figure 4B:
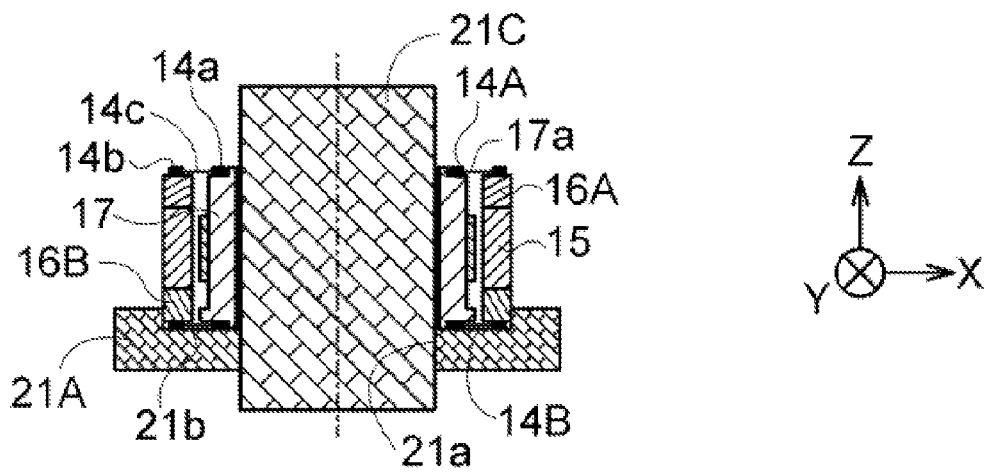

Then, as shown in FIG. 4B, after the back side spring component mounting clamp 21B is dismounted from the centering clamp 21C, under the condition that the third deep digging part 21b faces to the +Z side, the opening part 21a of the front side spring component mounting clamp 21A and the −Z side end part of the centering clamp 21C are aligned to each other. Moreover, the back side magnet support 16B is inserted in the third deep digging part 21b of the front side spring component mounting clamp 21A, so that the back side end part 16b abuts against the bottom surface of the third deep digging part. Thereafter, the front side spring component 14A is disposed on the +Z sides of the lens support 17 and the front side magnet support 16A, the inner side retaining part 14a is connected to the front side connecting end 17b of the lens support 17, and the outer side retaining part 14b is connected to the front side end part 16a of the front side magnet support 16A.

Figure 4C:
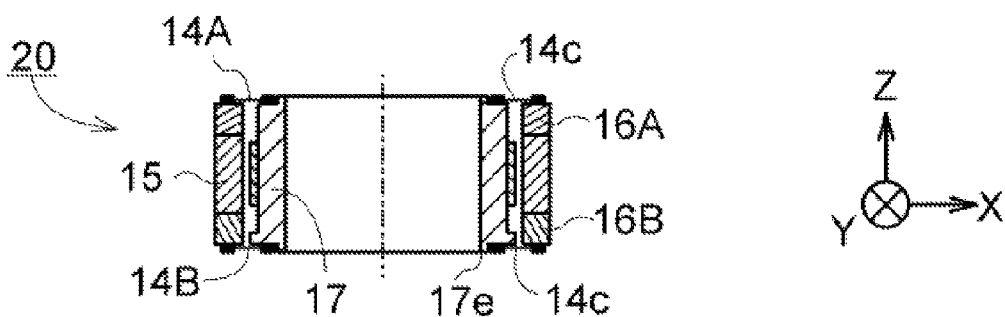

As shown in FIG. 4C, the front side spring component mounting clamp 21A and the centering clamp 21C are dismounted. Right now, as shown in FIG. 1A, FIG. 1B and FIG. 2, the inner side retaining part 14a and the outer side retaining part 14b of the spring component 14 are mutually connected together through the inner side connecting part 14e, the outer side connecting part 14f and the wrist parts 14c, and are formed in a state that the inner side retaining part 14a and the outer side retaining part 14b are connected together by the spoke parts 14g.

From this, the inner side retaining part 14a of the back side spring component 14B is connected with the outer side retaining part 14b by the spoke parts 14g so as to keep a concentric relation, and thus, the lens support 17 connected with the inner side retaining part 14a cannot offset in the directions (X-axis direction, Y-axis direction) orthogonal to the Z axis, or the back side magnet support 16B connected with the outer side retaining part 14b cannot offset in the directions orthogonal to the Z axis, or the wrist parts 14c of the back side spring component 14B cannot be distorted in the directions orthogonal to the Z axis even if the clamps are replaced during the process of converting the working procedure of connecting the back side spring component 14B into the working procedure of connecting the front side spring component 14A.

Thus, the wrist parts 14c of the back side spring component 14B cannot be distorted during the procedure of connecting the front side spring component 14A with the lens support 17 and the front side magnet support 16A. In addition, the wrist parts 14c of the front side spring component 14A cannot be distorted, and the front side spring component 14A can be connected with the lens support 17 and the front side magnet support 16A.

Moreover, the spoke parts 14g do not need to be arranged on both of the front side spring component 14A and the back side spring component 14B, for example, the spoke parts 14g can be only arranged on the spring component 14 on one side provided with the wrist parts 14c according to the connecting method of the spring component 14 or the used clamps, wherein the stress of the spring component 14 generated in the direction parallel to the Z axis easily becomes larger.

Then, as shown in FIG. 1B, the front end parts of the spoke parts 14g including the connecting pieces 14j projected on the outer side of the outer side retaining part 14b are divided by utilizing high-power laser so as to release the connection of the spoke parts 14g between the inner side retaining part 14a and the outer side retaining part 14b based on the spoke parts 14g. As a result, the inner side retaining part 14a and the outer side retaining part 14b are connected just by the wrist parts 14c, while the spring component 14 is taken as a spring capable of moving the lens support 17 in the Z-axis direction in a suspended manner to take effect.

Therefore, the coil 18 is electrified, and the coil 18 generates Lorentz force in the +Z-axis direction, so that the lens support 17 moves to a position at which the Lorentz force is balanced with restoring force of the spring component 14. Therefore, the coil 18 can enable the lens 11 retained on the lens support 17 to move to a preset position.

The front side spring component mounting clamp 21A and the centering clamp 21C are dismounted, the connection between the inner side retaining part 14a and the outer side retaining part 14b based on the spoke parts 14g is released, and the wrist parts 14c of the back side spring component 14B, or the wrist parts 14c of the front side spring component 14A, of the actuator unit 20 in a freely suspended state cannot be distorted by offset in the direction parallel to the Z axis. Therefore, the supported lens support 17 in a suspended manner cannot twist or rotate and can move towards the Z-axis direction stably.

Figure 4D:
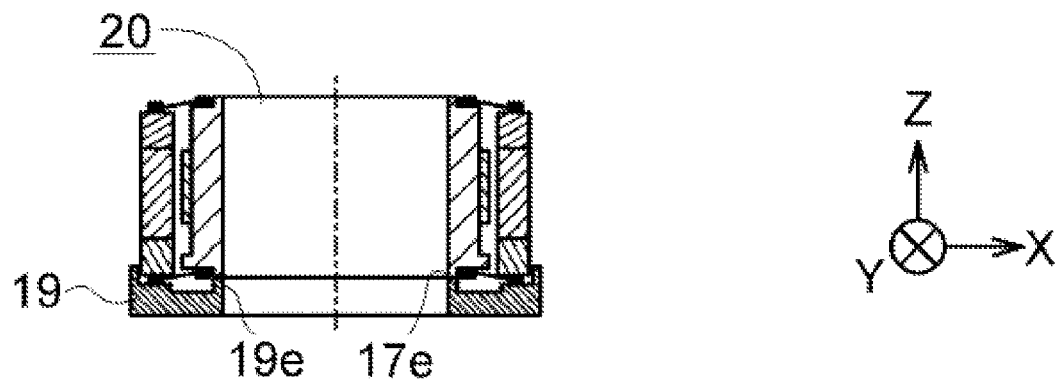

As shown in FIG. 4D, the connection for the actuator unit 20 based on the spoke parts 14g is released, a base 19 is mounted on the back side magnet support 16B at the back of the Z-axis direction, and a limiting part 19e of the base 19 projected in the +Z-axis direction abuts against the back side end part 17e of the lens support 17, and thus the lens support 17 is subjected to the offset in front of the Z-axis direction. Moreover, in FIG. 1B and FIG. 3, the actuator unit 20 that the connection of the spoke parts 14g is released is assembled in the lens driving device 10, the actuator unit 20 is retained by a magnet yoke 12 and the base 19 from the +Z side and the −Z side.

Below, the structure of the lens driving device 10 except the actuator unit 20 is described.

As shown in FIG. 3, the magnet yoke 12 is mounted in front of the Z-axis direction of the actuator unit 20, is prolonged radially inwards from the +Z side end part of each side face 12a formed by four surfaces parallel to the Z axis, and is provided with a top surface 12b with an opening part 12c at the central part to form a box shape. The magnet yoke 12 covers the front part and the side faces of the actuator unit in the Z-axis direction, so that the strength of a magnetic field generated by the magnet 15 is improved, and electromagnetic waves emitted from the coil 18 or the unshown image sensor are sheltered.

The base 19 is mounted at the back of the Z-axis direction of the actuator unit 20, and includes a plate-shaped base plate 19b, a frame-shaped side wall 19c vertically arranged from the outer edge of the base plate 19b to the +Z-axis direction, a deep digging part 19d formed by deep digging from the inner diameter side of the base plate 19b to the back of the Z-axis direction, a circular ring-shaped limiting part 19e which is protruding from the inner edges of the deep digging part 19d to the side of the lens support 17 and abuts against the back side end part 17e of the lens support 17 when the coil 18 is not electrified so as to limit the lens support 17 onto a backmost position, and a circular opening part 19a which faces to the Z-axis direction and is formed in the inner edge of the limiting part 19e.

A fixed ring 13 is formed to be square frames-shaped and is inserted in the inner side of the magnet yoke 12 from the −Z side of the magnet yoke 12, and the actuator unit 20 is inserted in the fixed ring 13 from the −Z side of the fixed ring 13. The outer side retaining part 14b of the front side spring component 14A is clamped by the top surface 12b of the magnet yoke 12 and the front side end part 16a of the front side magnet support 16A in virtue of the fixed ring 13.

A concave part 13a is formed at the position that the surface on the −Z side of the fixed ring 13 abuts against the spoke parts 14g of the front side spring component 14A remaining after being cut, and is concave from the surface on the −Z side of the fixed ring 13 to the front of the Z-axis direction. The concave part 13a is concave forwards in the Z-axis direction, so that the fixed ring 13 is not contacted with at least the first spoke parts 14h when the outer side retaining part 14b is connected. And then, the actuator unit 20 is inserted in the inner side of the side wall 19c of the base 19 pressed from the −Z side, and the outer side retaining part 14b of the back side spring component 14B is clamped by the base plate 19b of the base 19 and the back side end part 16b of the back side magnet support 16B.

As mentioned above, in the actuator unit 20 assembled in the lens driving device 10, the wrist parts 14c of the spring component 14 cannot be distorted in the directions orthogonal to the Z-axis direction.

Therefore, in the lens driving device 10, when the lens support 17 abuts against the limiting part 19e to be positioned at the backmost position, and when the coil 18 operates and the lens support 17 moves forwards in the Z-axis direction in the state that the lens support 17 is separated from the limiting part 19e, the lens support 17 accurately faces to the Z-axis direction and cannot be inclined.

Moreover, when the actuator unit 20 operates, the lens support 17 is prevented from being contacted with the first spoke parts 14h after the connection of the spoke parts 14g is released by utilizing the concave part 16d of the front side magnet support 16A, the concave part 16e of the back side magnet support 16B and the concave part 13a of the fixed ring 13. Therefore, the lens support 17 can be moved forwards in the Z-axis direction or backwards in the Z-axis direction. Moreover, the concave parts 16d, 16e and 13a can be deformed according to the forming positions and shapes of the spoke parts 14g and the moving direction of the lens support 17, or can be omitted.

In addition, the following structure is illustrated in the description, namely, the magnets 15 are retained by the front side magnet support 16A and the back side magnet support 16B, the outer side retaining parts 14b of the spring components 14 are connected with the front side magnet support 16A and the back side magnet support 16B, but the structure is not limited to this, and the outer side retaining parts 14b can also be directly connected with the magnets 15.

Figure 5:
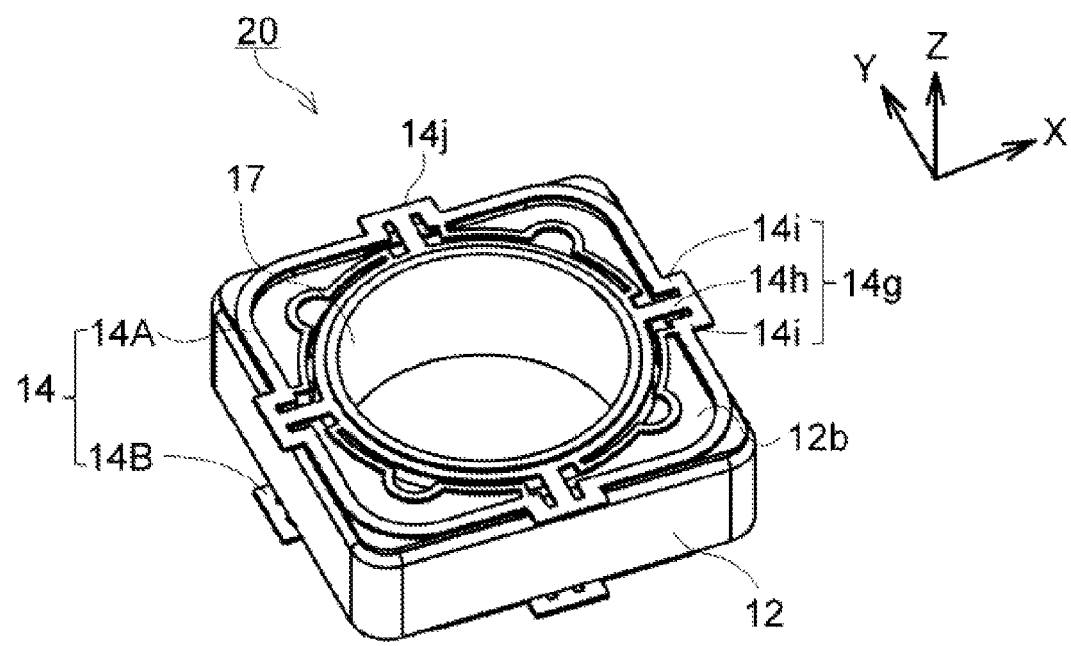
FIG. 5 is a perspective view of another actuator unit of an embodiment of the present invention.

FIG. 5 is a perspective view of the actuator unit in according to a transformation embodiment of the present invention. The front side spring component 14A is assembled on the +Z side of the magnet yoke 12, and on this point, the shown actuator unit 20 is different from that in the above first embodiment.

Under the condition that the front side spring component 14A is arranged on the +Z side, but not the −Z side, of the magnet yoke 12, the coil 18 is mounted on the periphery of the lens support 17, and the magnets 15 and the outer circumference side face of the coil 18 are partitioned at an interval and arranged oppositely along the radial direction on the outer side of the coil 18.

The magnets 15 are clamped at the corners of the square frame by four sides of the front side magnet support 16A and the side walls 16c projected towards the Z-axis direction from the central parts of the four sides of the front side magnet support 16A and the four sides of the back side magnet support 16B.

The magnets 15 clamped between the front side magnet support 16A and the back side magnet support 16B are inserted in the inner side of the magnet yoke 12 from the −Z side so as to be fixed. The inner side retaining part 14a of the back side spring component 14B is connected with the back side connecting end 17b arranged at the back of the lens support 17 in the Z-axis direction, and the back side end part 16b of the back side magnet support 16B is connected with the outer side retaining part 14b. Moreover, the inner side retaining part 14a of the front side spring component 14A is connected with the front side connecting end 17a arranged in front of the Z-axis direction of the lens support 17, and the outer side retaining part 14b is connected with the surface on the +Z side of the top surface 12b of the magnet yoke 12, so that the actuator unit 20 is formed.

Above, even if the lens driving device 10 assembled by using the actuator unit 20 as shown in FIG. 5 enables the coil 18 to operate so as to enable the lens support 17 to move in the +Z-axis direction, the lens support 17 can also move in the Z-axis direction accurately, and thus the lens support 17 cannot be inclined.

Below, various transformation embodiments of the spring component 14 are described by using FIG. 6 to FIG. 11.

Figure 6:
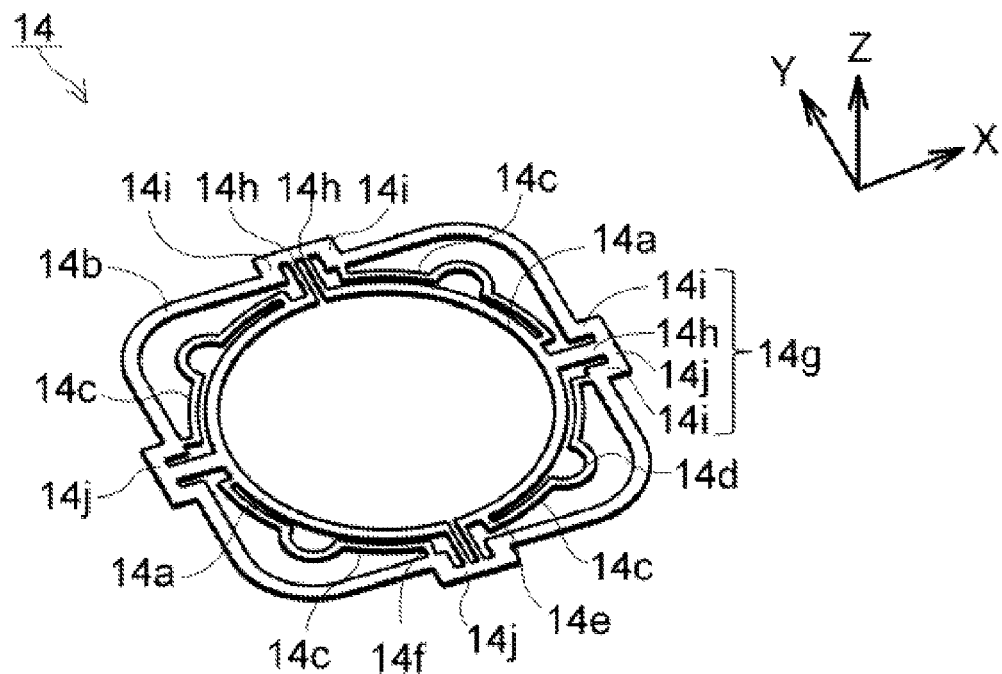
FIG. 6 is a perspective view of another spring component of the actuator unit of an embodiment of the present invention.

The spring component 14 as shown in FIG. 6 is integrally formed through etching, and is provided with a circular ring-shaped inner side retaining part 14a divided into two parts along the +X side and the −X side, a square frame-shaped outer side retaining part 14b, a plurality of wrist parts 14c disposed between the inner side retaining part 14a and the outer side retaining part 14b and each provided with a bending part 14d at the central part, a plurality of inner side connecting parts 14e each for connecting the inner side retaining part 14a with one end of a corresponding one of the wrist parts 14c, a plurality of outer side connecting parts 14f for connecting the outer side retaining part 14b with the other ends of the wrist parts 14c, and spoke parts 14g each of which includes one or two first spoke parts 14h prolonged radially from the inner side retaining part 14a to the radial direction, two second spoke parts 14i prolonged radially from the outer side retaining part 14b to the radial direction and a connecting piece 14j for mutually connecting the outer side end part of the second spoke part 14i on the outer side of the outer side retaining part 14b.

Two (all together four) first spoke parts 14h prolonged in the Y-axis direction are respectively arranged on the +Y side end part and the −Y side end part of the inner side retaining part 14a divided into two parts in a circular arc-shaped manner, and one (all together two) first spoke part 14h prolonged in the X-axis direction is respectively arranged on the +X side and the −X side of the inner side retaining part 14a. Two (all together four) second spoke parts 14i prolonged in the X-axis direction and parallel to the first spoke parts 14h are respectively arranged at the two sides of the Y-axis direction, of the central parts of the four sides of the outer side retaining part 14b, and two (all together four) second spoke parts 14i prolonged in the Y-axis direction and parallel to the first spoke parts 14h are respectively arranged at the two sides of the X-axis direction, of the central parts of the four sides of the outer side retaining part 14b.

Even if under the condition that the spring component 14 as shown in FIG. 6 is used, the actuator unit 20 which cannot be inclined when the lens support 17 moves can also be formed.

Figure 7:
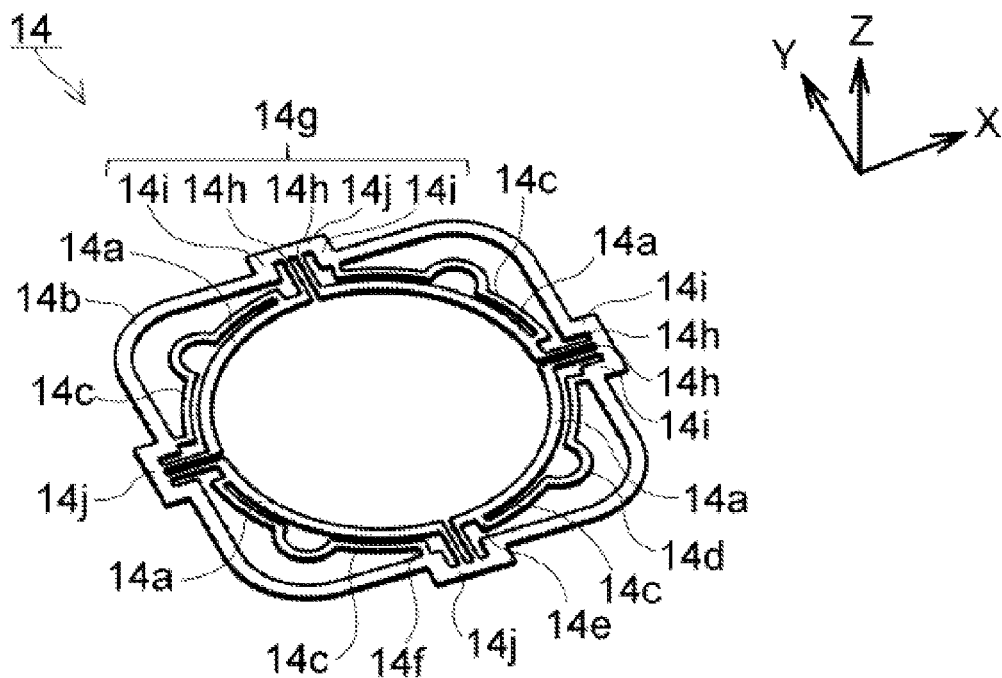
FIG. 7 is a perspective view of yet another spring component of the actuator unit of an embodiment of the present invention.

Moreover, the actuator unit 20 in which the spring component 14 as shown in FIG. 7 is used can also be formed.

The spring component 14 is integrally formed through etching, and is provided with a circular ring-shaped inner side retaining part 14a divided into four equal parts on the +X side, the −X side, the +Y side and the −Y side, a square frame-shaped outer side retaining part 14b, a plurality of wrist parts 14c disposed between the inner side retaining part 14a and the outer side retaining part 14b and each provided with a bending part 14d at the central part, a plurality of inner side connecting parts 14e each for connecting the inner side retaining part 14a with one end of a corresponding one of the wrist parts 14c, a plurality of outer side connecting parts 14f for connecting the outer side retaining part 14b with the other ends of the wrist parts 14c, and spoke parts 14g each of which includes two first spoke parts 14h prolonged radially from the inner side retaining part 14a to the radial direction, two second spoke parts 14i prolonged radially from the outer side retaining part 14b to the radial direction and a connecting piece 14j for mutually connecting the outer side end part of the second spoke parts 14i on the outer side of the outer side retaining part 14b.

Two (all together four) first spoke parts 14h prolonged in the Y-axis direction are respectively arranged on the +Y side end part and the −Y side end part of the inner side retaining part 14a divided into four equal parts in a circular arc-shaped manner, and two (all together four) first spoke parts 14h prolonged in the X-axis direction is respectively arranged on the +X side and the −X side of the inner side retaining part 14a one by one. Two (all together eight) second spoke parts 14i prolonged in the X-axis direction or the Y-axis direction and parallel to each first spoke part 14h are respectively arranged at the central part of each side of the outer side retaining part 14b one by one.

Under the condition that the spring component 14 as shown in FIG. 7 is used, the actuator unit 20 which cannot be inclined when the lens support 17 moves can also be formed.

Figure 8:
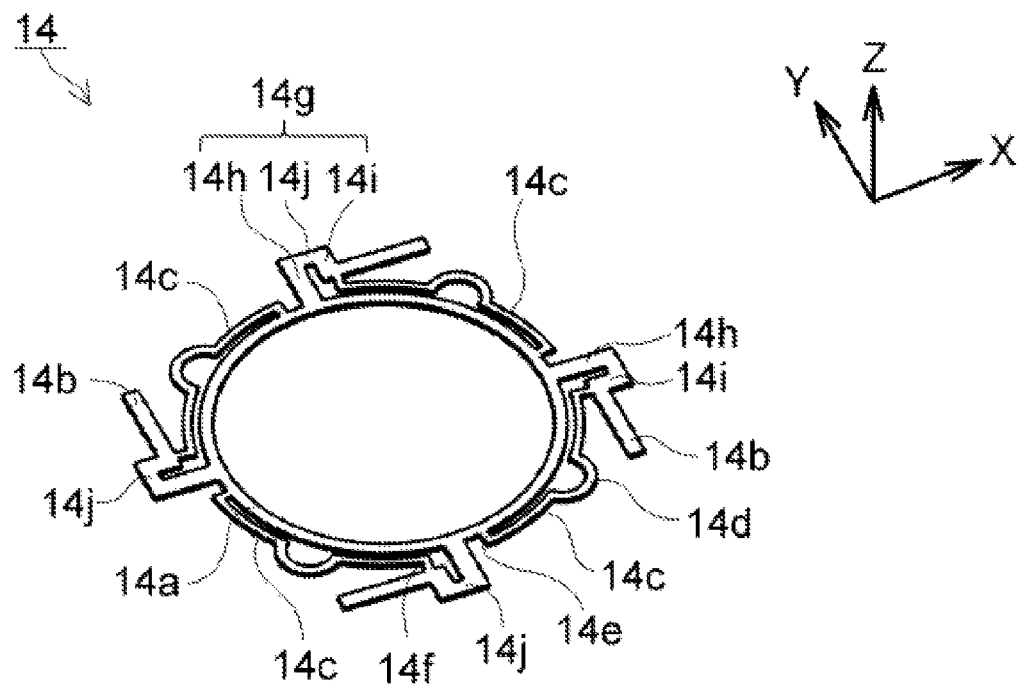
FIG. 8 is a perspective view of further another spring component of the actuator unit of an embodiment of the present invention.

Moreover, the actuator unit 20 in which the spring component 14 as shown in FIG. 8 is used can also be formed.

The spring component 14 is integrally formed through etching, and is provided with a circular ring-shaped inner side retaining part 14a, four outer side retaining parts 14b prolonged to the neighborhood of the bending parts 14d from the ends of the second spoke parts 14i in the X-axis direction or the Y-axis direction, a plurality of wrist parts 14c disposed between the inner side retaining part 14a and the outer side retaining parts 14b and each provided with one bending part 14d at the central part, a plurality of inner side connecting parts 14e each for connecting the inner side retaining part 14a with one end of a corresponding one of the wrist parts 14c, a plurality of outer side connecting parts 14f for connecting the outer side retaining part 14b with the other ends of the wrist parts 14c, and spoke parts 14g for connecting the inner side retaining part 14a with the outer side retaining parts 14b mutually.

Moreover, each spoke part 14g includes a first spoke part 14h, a second spoke part 14i and a connecting piece 14j. Four first spoke parts 14h are respectively arranged at the +X side, the −X side, the +Y side and the −Y side of the inner side retaining part 14a, and the first spoke parts 14h are prolonged in the X-axis direction and the Y-axis direction, respectively. Each second spoke part 14i is connected to the end which is connected to the outer side connecting part 14f, of the outer side retaining part 14b, and each second spoke part is parallel to the adjacent first spoke part, and the second spoke parts are prolonged in the X-axis direction and the Y-axis direction respectively. Each connecting piece 14j is used for connecting an outer side end par of a first spoke part 14h and an adjacent second spoke part 14i.

Under the condition that the spring component 14 as shown in FIG. 8 is used, the actuator unit 20 which cannot be inclined when the lens support 17 moves can also be formed.

Figure 9:
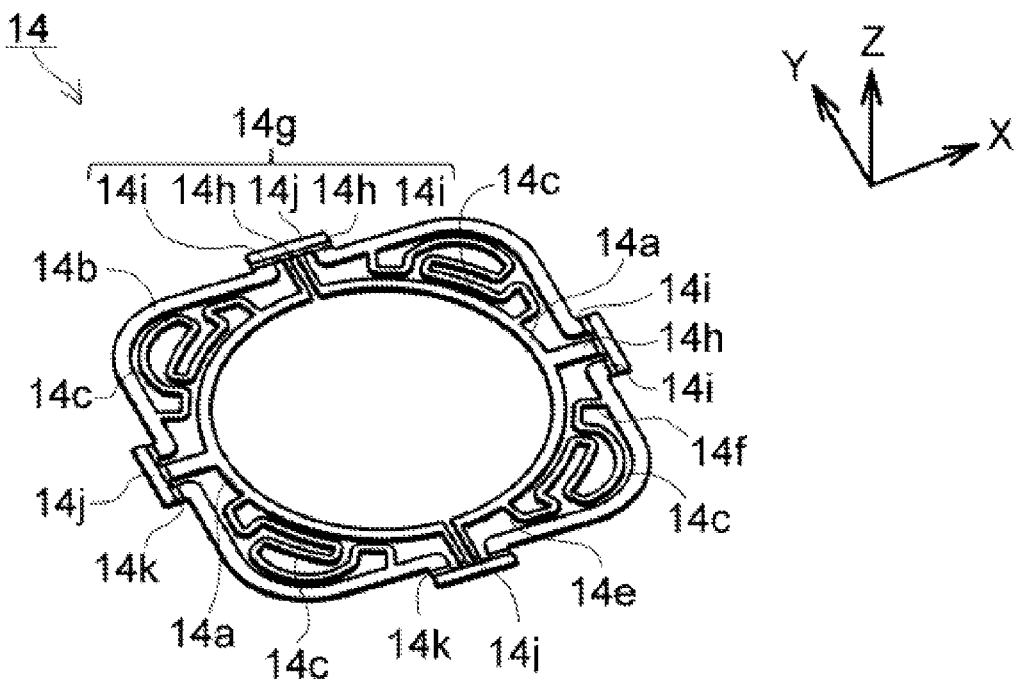
FIG. 9 is a perspective view of another spring component of the actuator unit of an embodiment of the present invention.

Moreover, the actuator unit 20 in which the spring component 14 as shown in FIG. 9 is used can also be formed.

The spring component 14 is integrally formed through etching, and is provided with a circular ring-shaped inner side retaining part 14a divided into two parts along the +X side and the −X side, a square frame-shaped outer side retaining part 14b, a plurality of wrist parts 14c which are disposed between the inner side retaining part 14a and the outer side retaining part 14b and are bent repeatedly in the diameter direction and the circumference direction, a plurality of inner side connecting parts 14e each for connecting the inner side retaining part 14a with one end of a corresponding one of the wrist parts 14c, a plurality of outer side connecting parts 14f for connecting the outer side retaining part 14b with the other ends of the wrist parts 14c, and spoke parts 14g each of which includes one or two first spoke parts 14h prolonged radially from the inner side retaining part 14a to the radial direction, two second spoke parts 14i prolonged radially from the outer side retaining part 14b to the radial direction and a connecting piece 14j for mutually connecting the outer side end part(s) of the first spoke part(s) 14h and the second spoke parts 14i on the outer side of the outer side retaining part 14b.

The first spoke parts 14h are prolonged from the inner side retaining part 14a divided into two equal parts in a circular arc-shaped manner to the Y-axis direction in the directions of +Y side and −Y side, and two (all together four) first spoke parts are respectively arranged on each end part. Moreover, the first spoke parts 14h are prolonged in the X-axis direction in the directions of +X side and −X side, and one (all together two) first spoke part is respectively arranged. Moreover, two (all together eight) second spoke parts 14i prolonged in the X-axis direction or the Y-axis direction and parallel to each first spoke part 14h are respectively arranged at the central part of each side of the outer side retaining part 14b.

Moreover, a groove cutting part 14k is a thin wall part formed near the front ends of the spoke parts 14g projected on the outer side of the outer side retaining part 14b, and is processed and formed through semi-etching.

Under the condition that the spring component 14 is used, the actuator unit 20 which cannot be inclined when the lens support 17 moves can also be formed.

Therefore, the spring component 14 as shown in FIG. 9 can replace the high-power laser, and the spoke parts 14g can be bent from the groove cutting part 14k, so that the connection of the spoke parts 14g between the inner side retaining part 14a and the outer side retaining part 14b can be released.

Figure 10A:
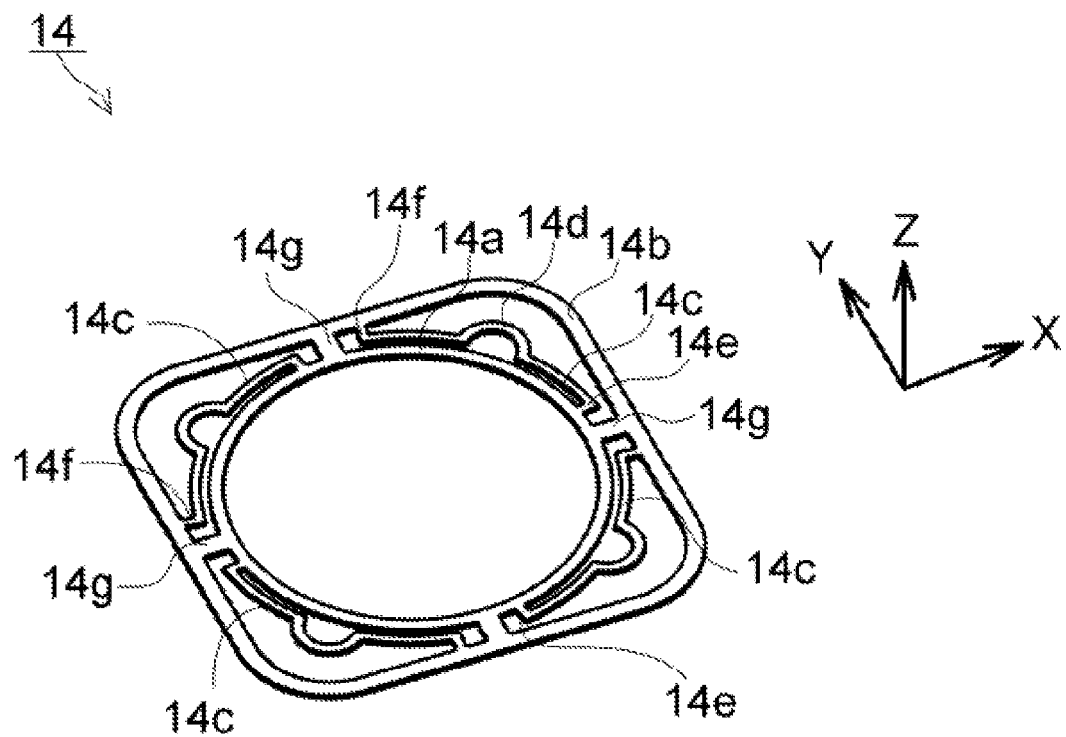
FIG. 10A and FIG. 10B are perspective views of other spring components of the actuator unit of an embodiment of the present invention.
Figure 10B:
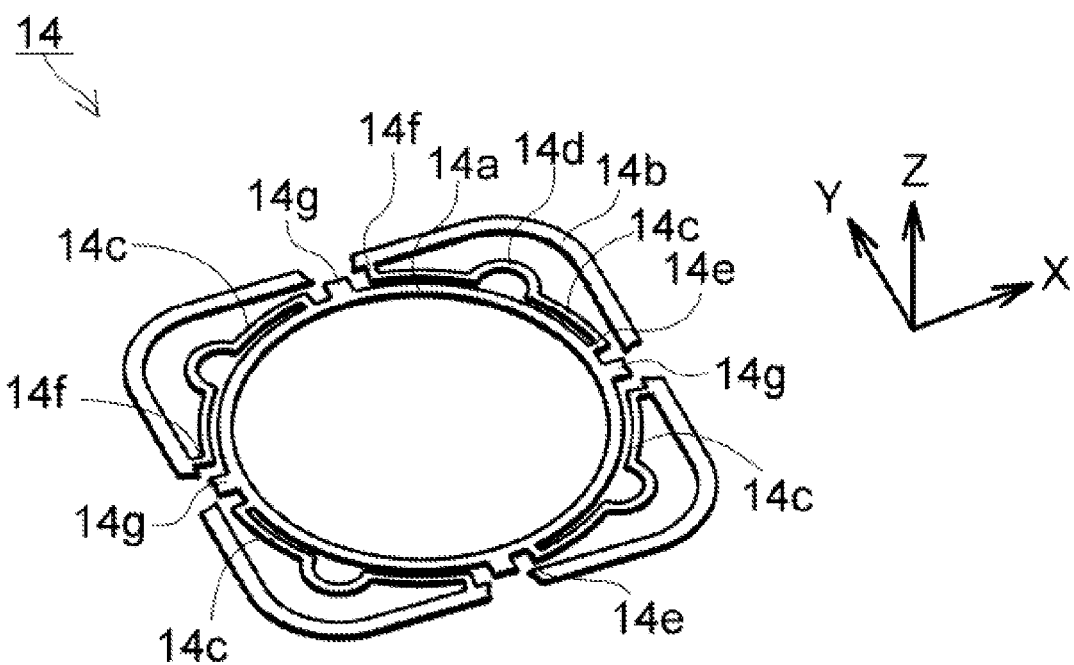

Moreover, the actuator unit 20 in which the spring component 14 as shown in FIG. 10A and FIG. 10B is used can also be manufactured.

As shown in FIG. 10A, the spring component 14 is integrally formed through etching, and is provided with a circular ring-shaped inner side retaining part 14a, a square frame-shaped outer side retaining part 14b, a plurality of wrist parts 14c disposed between the inner side retaining part 14a and the outer side retaining part 14b and each provided with a bending part 14d at the central part, a plurality of inner side connecting parts 14e for connecting the inner side retaining part 14a with one end of a corresponding one of the wrist parts 14c, a plurality of outer side connecting parts 14f for connecting the outer side retaining part 14b with the other ends of the wrist parts 14c, and spoke parts 14g which are prolonged radially in the radial direction and are used for connecting the inner side retaining part 14a with the outer side retaining part 14b.

The spoke parts 14g under the condition are not divided into the first spoke parts 14h and the second spoke parts 14i as mentioned above, and the inner side retaining part 14a is directly connected with the outer side retaining part 14b through the spoke parts 14g.

As shown in FIG. 10B, a plurality of T-shape regions for connecting the spoke parts 14g with the outer side retaining part 14b are divided by the high-power laser, and thus the connection of the spoke parts 14g between the inner side retaining part 14a and the outer side retaining part 14b can be released. Or, divided regions can also be changed for connecting the spoke parts 14g with the inner side retaining part 14a so as to be divided in a T-shaped region.

Under the condition that the spring component 14 is used, the actuator unit 20 which cannot be inclined when the lens support 17 moves can also be formed.

Figure 11A:
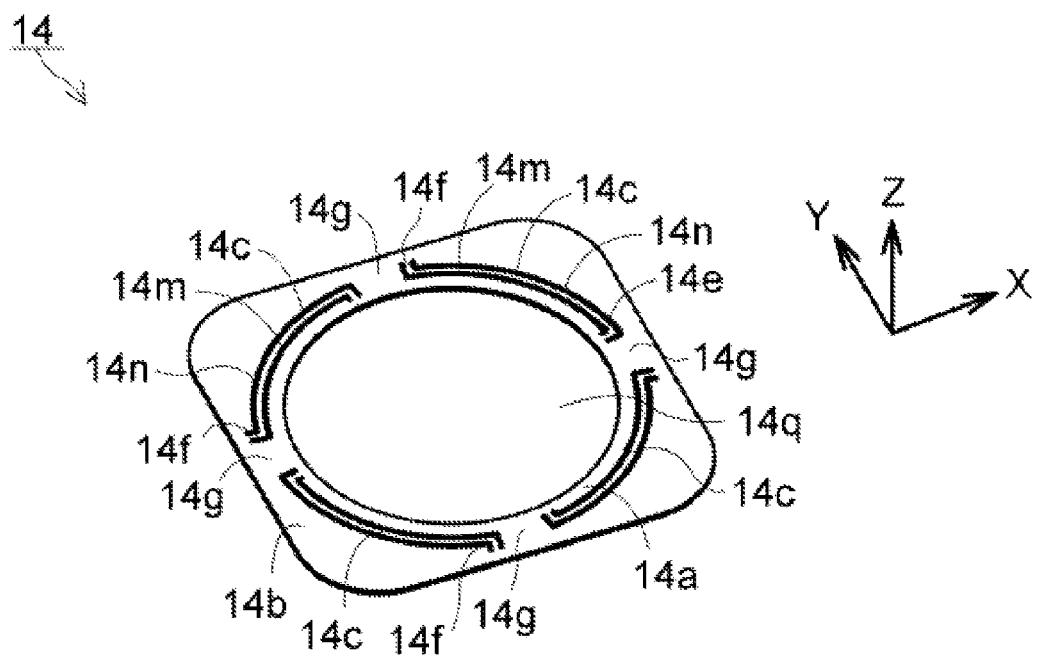
FIG. 11A and FIG. 11B are perspective views of other spring components of the actuator unit of an embodiment of the present invention.
Figure 11B:
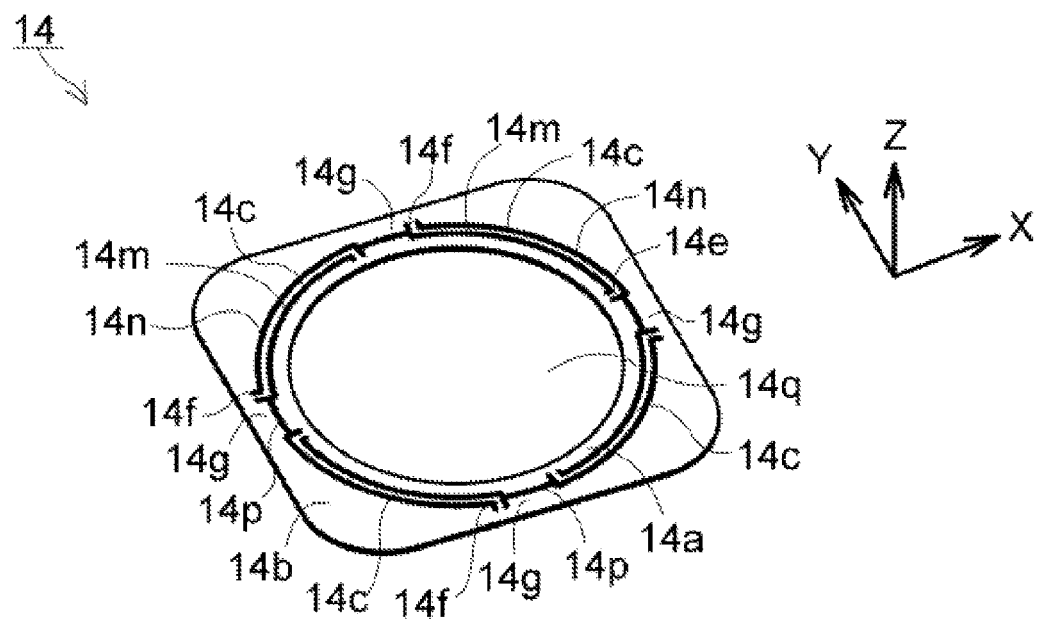

Moreover, the actuator unit 20 in which the spring component 14 as shown in FIG. 11A and FIG. 11B is used can also be manufactured.

The spring component 14 as shown in FIG. 11A is a quadrangle-shaped plate-shaped component provided with a circular opening part 14q at the central part, and is formed by a plurality of inner side contour lines 14m and a plurality of outer side contour lines 14n formed by hollowing out a board.

Namely, the spring component 14 is formed through etching, and is provided with the inner side contour lines 14m and the outer side contour lines 14n, wherein each inner side contour line 14m is composed of the contour line of the inner circumference side of a circular arc-shaped wrist part 14c, a contour line of the inner side connecting part 14e connected with the contour line and a contour line of the outer side connecting part 14f. Each outer side contour line 14n is composed of the contour line of the outer circumference side of a circular arc-shaped wrist part 14c, another contour line of the inner side connecting part 14e connected with the contour line and another contour line of the outer side connecting part 14f.

Thus, in the quadrangle-shaped plate-shaped component, the part closer to the inner diameter side than the inner side contour line 14m is taken as the inner side retaining part 14a to take effect, the part closer to the outer diameter side than the outer side contour line 14n is taken as the outer side retaining part 14b to take effect, and the part clamped between the inner side contour line 14m and the outer side contour line 14n is taken as the inner side connecting part 14e, the wrist parts 14c and the outer side connecting part 14f which are serially connected to take effect. Moreover, the region which is formed between the inner side connecting part 14e and the outer side connecting part 14f and is used for connecting the inner side retaining part 14a and the outer side retaining part 14b is taken as the spoke parts 14g to take effect.

The spring component 14 is assembled through the working procedure the same as that as shown in FIG. 4A to FIG. 4C. Specifically, the back side spring component 14B is respectively connected to the lens support 17 and the back side magnet support 16B, and after the front side spring component 14A is connected to the lens support 17 and the front side magnet support 16A, mutual connection of the spoke parts 14g between the inner side retaining part 14a and the outer side retaining part 14b is released.

Namely, the front side spring component 14A and the back side spring component 14B are respectively connected onto the lens support 17, the front side magnet support 16A and the back side magnet support 16B. Then, as shown in FIG. 11B, the board is penetrated, the high-power laser is utilized, a hollow-out line 14p for transversely cutting the spoke parts 14g along the circumference direction is formed between the inner side contour line 14m and the outer side contour line 14n, and the connection of the spoke parts 14g between the inner side retaining part 14a and the outer side retaining part 14b is released. Therefore, even if the spring component 14 as shown in FIG. 11 is used, the actuator unit 20 which cannot be inclined when the lens support 17 moves can also be formed.

Moreover, in the spring component 14 as shown in FIG. 11, the spring component 14 is formed to be the quadrangle-shaped plate-shaped component provided with the circular opening part 14q at the central part, after the front side spring component 14A and the back side spring component 14B are respectively connected to the lens support 17, the front side magnet support 16A and the back side magnet support 16B, the high-power laser is also utilized, and the board is hollowed out to form the inner side contour lines 14m, the outer side contour lines 14n and the hollow-out lines 14p.

Figure 12:
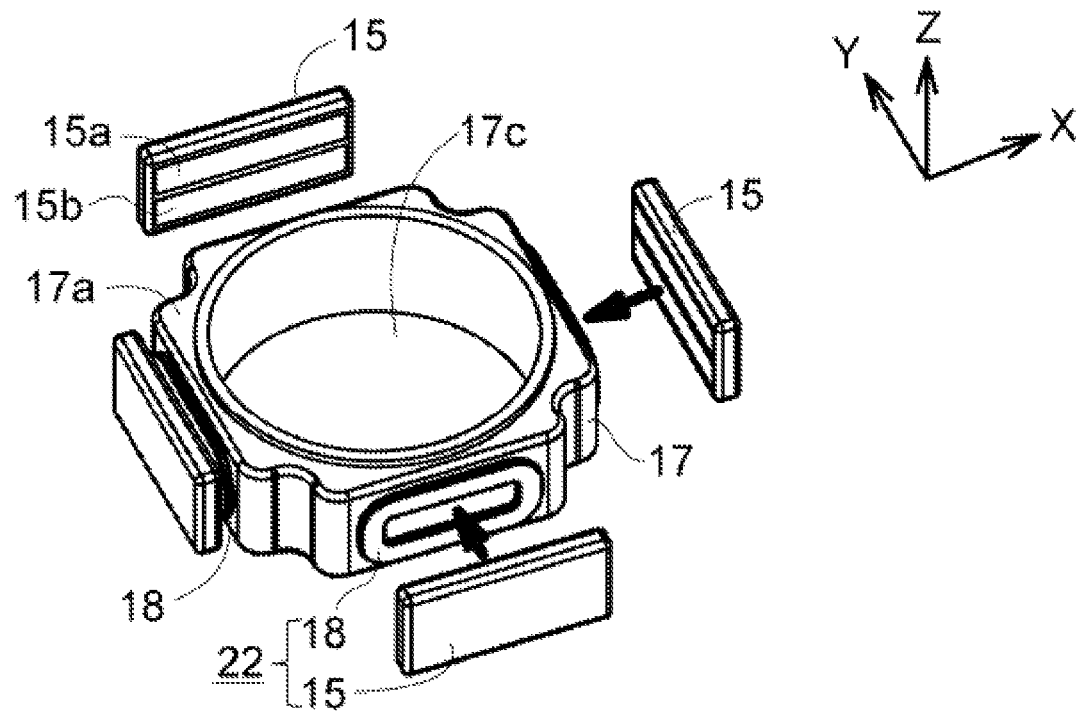
FIG. 12 is a perspective view of another composition, suitable for an available electromagnetic driving mechanism, of the actuator unit of the present invention.

As shown in FIG. 12, the actuator unit 20 can also includes the electromagnetic driving mechanism 22 composed of the coils 18 and the magnets 15 the lens, the lens support 17 and the spring component 14 as mentioned above in each deformation embodiment.

In this case, the lens support 17 is provided with a circular opening part 17c along the Z-axis direction so as to form the shape of a square cylinder with concave corners, and the lens 11 is retained on the inner side of the opening part 17c.

The coils 18 for forming the electromagnetic driving mechanism 22 are respectively wound around axises which are parallel to the X-axis and the Y-axis in a quadrilateral shape, and are mounted on the outer circumference of the lens support 17. The magnets 15 forming the electromagnetic driving mechanism 22 are respectively positioned on the front coiling faces of the coils 18 in a cuboid shape, and are respectively disposed around the axises parallel to the Z-axis at a 90-degree interval. A magnetic pole 15a and a magnetic pole 15b which are polarized into different polarities are formed on a side face of each magnet 15, the +Z side coiling side and the −Z side coiling side of each coil 18 are respectively arranged opposite to the magnetic pole 15a and the magnetic pole 15b of a corresponding one of the magnets 15 at intervals.

Therefore, when the coils 18 is electrified, the coils 18 generate Lorentz force in the +Z-axis direction, so that the lens support 17 moves to a position at which the Lorentz force is balanced with restoring force of the spring component 14.

The lens support 17 and the electromagnetic driving mechanism 22 above described, combining with the spring component 14 which is provided with the spoke parts 14g for connecting the inner side retaining part 14a with the outer side retaining part 14b in a separatable manner, can also form the actuator unit 20.

Figure 13:
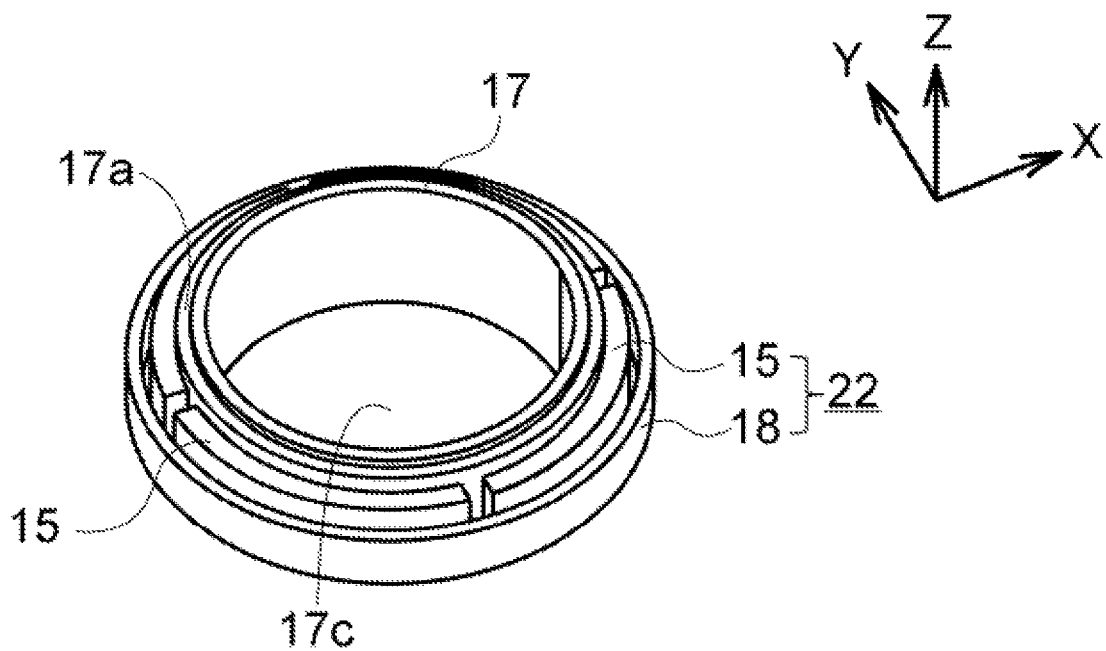
FIG. 13 is a perspective view of another composition of the electromagnetic driving mechanism suitable for the actuator unit of the present invention.
Figure 14A:
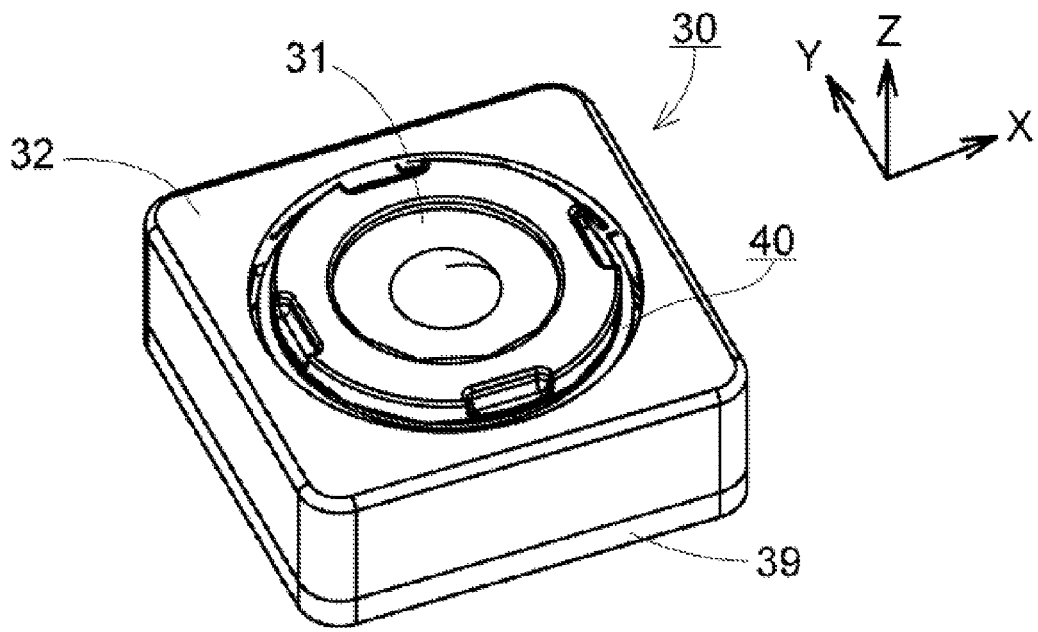
FIG. 14A and FIG. 14B are perspective views of an existing lens driving device and an existing actuator unit arranged in the lens driving device.
Figure 14B:
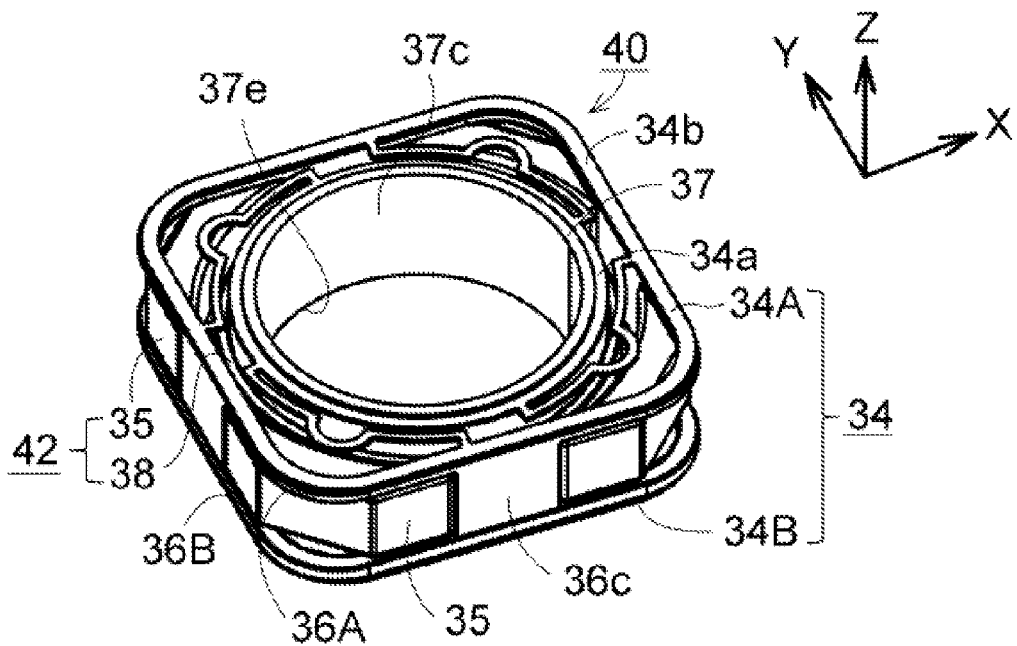
Figure 15:
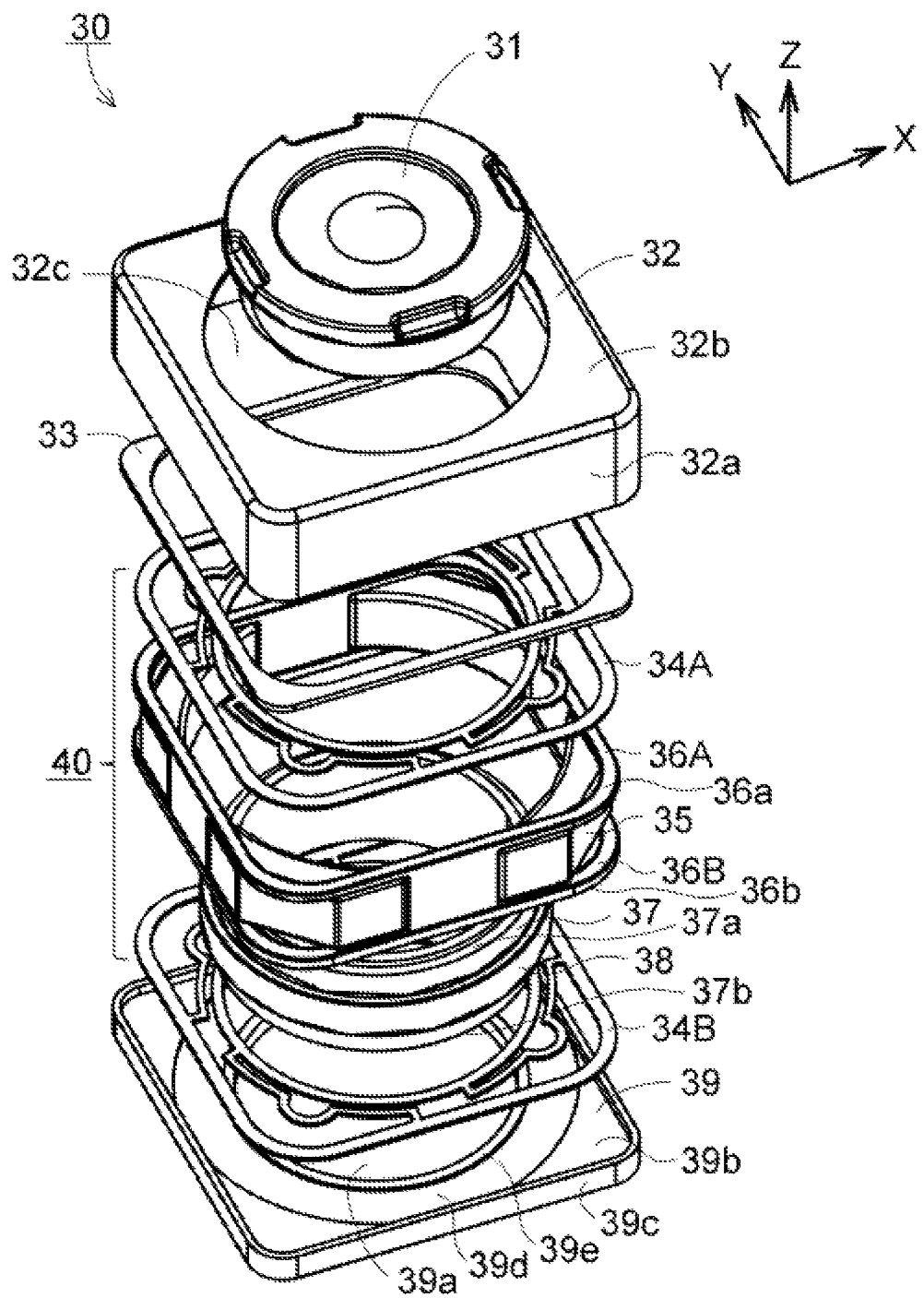
FIG. 15 is an exploded view of the lens driving device assembled with the existing actuator unit
Figure 16A:
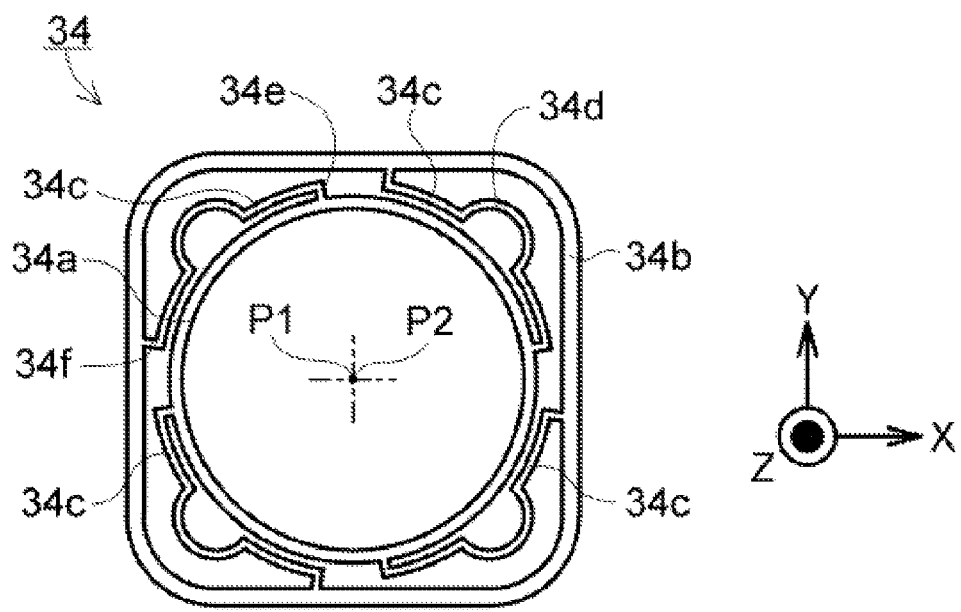
FIG. 16A and FIG. 16B are views of spring components of the existing actuator unit.
Figure 16B:
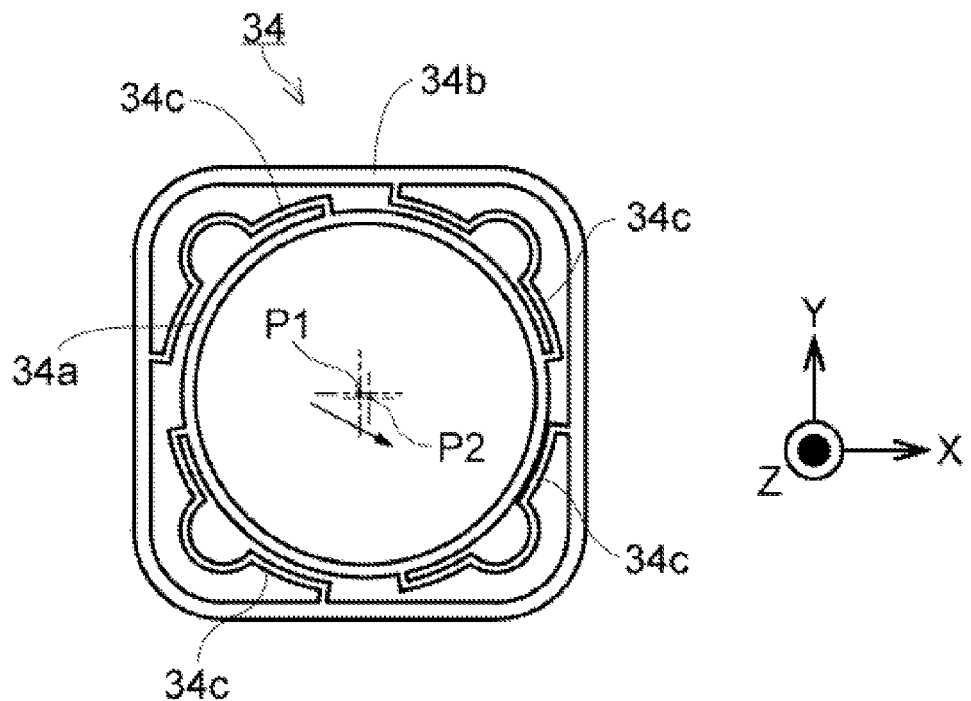
Figure 17A:
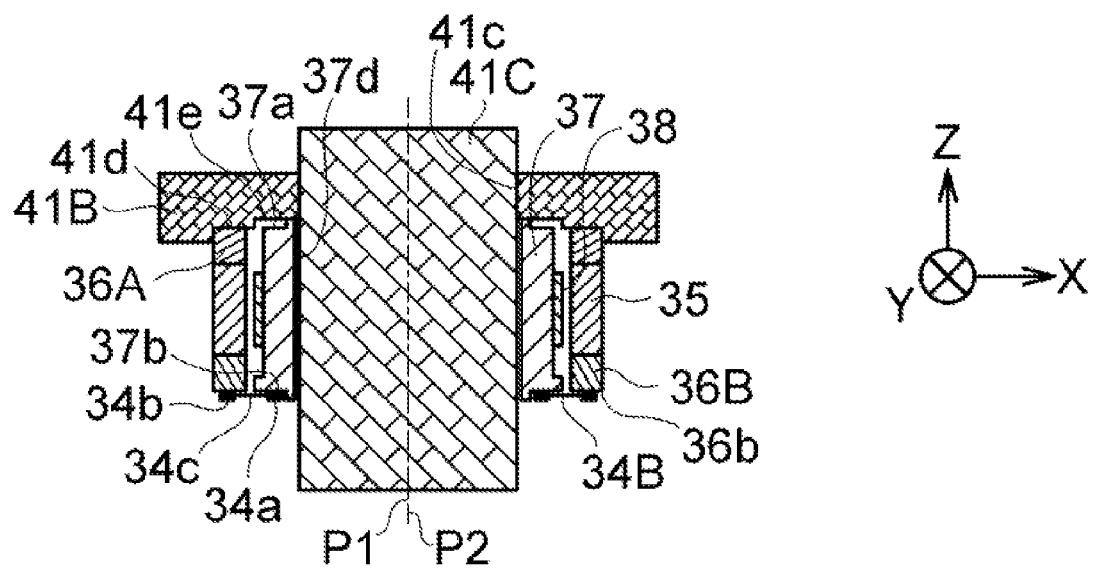
FIG. 17A to FIG. 17D are cross-sectional views illustrating an assembling working procedure of the existing actuator unit.
Figure 17B:
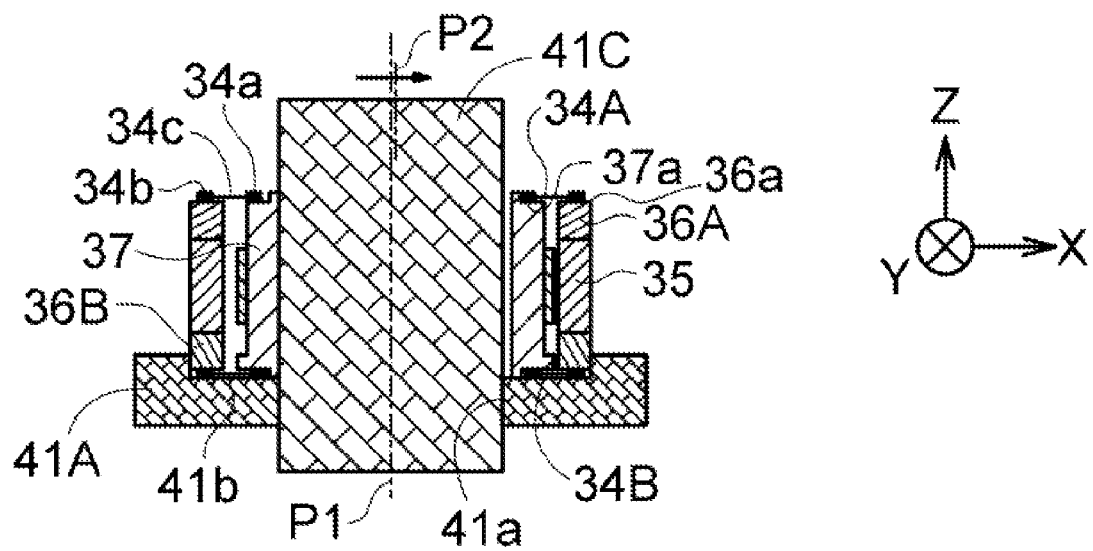
Figure 17C:
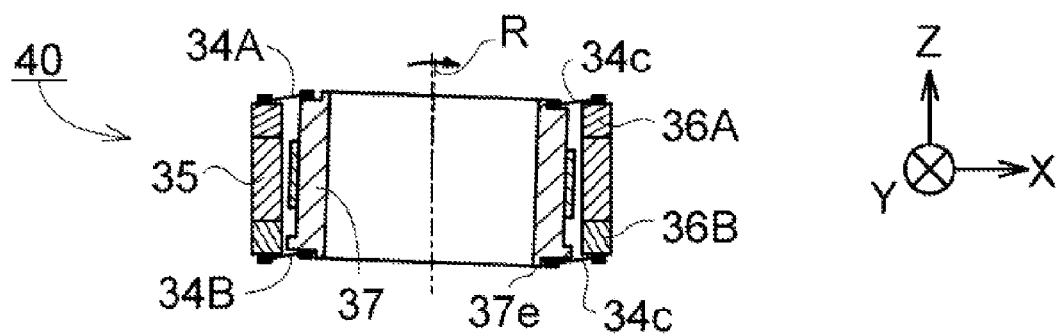
Figure 17D:
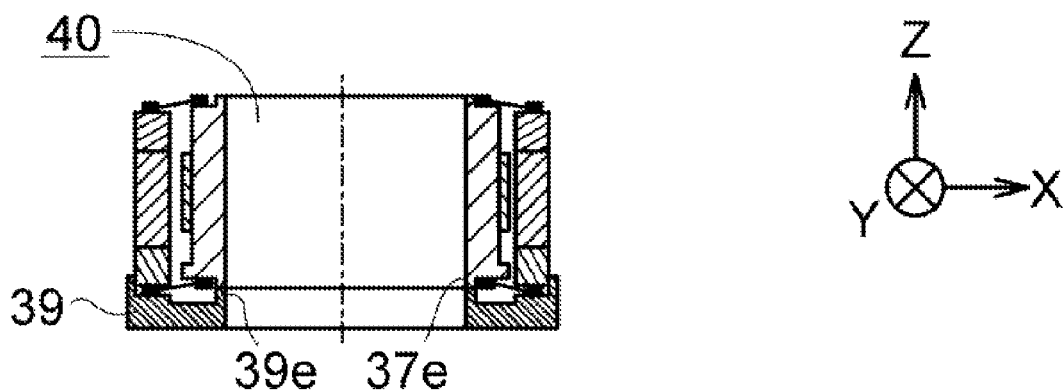

Moreover, as shown in FIG. 13, the configuration between the magnets 15 and the coils 18 for forming the electromagnetic driving mechanism 22 can be replaced, and the actuator unit 20 is formed by the lens support 17, the magnets 15 mounted on the lens support 17, the coil 18 disposed on the fixed side and the spring components 14 as shown in the embodiment.

The lens support 17 is circular and is provided with the opening part 17c facing to the Z-axis direction, and the lens 11 is retained on the inner side of the opening part 17c.

In this case, the circular arc-shaped magnets 15 are mounted on the cylindrical side face of the lens support 17 at a 90-degree interval and are integrally formed to be cylindrical shape, the coil 18 is wound around the axis parallel to the Z-axis in a cylindrical shape, and the outer circumference side face of the magnets 15 are arranged opposite to the inner circumference side face of the coil 18 at an interval along the radial direction.

Hereon, when the coil 18 is electrified, the coil 18 generates the Lorentz force in the −Z-axis direction, and thus the magnets 15 generate counter-acting force facing to the +Z direction, and the lens support 17 provided with the magnets 15 can move to the position at which the counter-acting force is balanced with the restoring force of the spring component 14.

The lens support 17 and the electromagnetic driving mechanism 22 above described, combining with the spring component 14 which is provided with the spoke parts 14g for connecting the inner side retaining part 14a with the outer side retaining part 14b in a separatable manner, can also form the actuator unit 20.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. An actuator unit, comprising:
    a lens support for retaining a lens;
    an electromagnetic driving mechanism for enabling the lens support to move along an optical axis of the lens; and
    two spring components for supporting the lens support to be capable of moving in a suspended manner;
    wherein at least one of the two spring components comprises:
    an inner side retaining part connected to a moving side of the actuator unit;
    an outer side retaining part connected to a fixed side of the actuator unit;
    a plurality of wrist parts disposed between the inner side retaining part and the outer side retaining part;
    a plurality of inner side connecting parts, prolonged from the inner side retaining part to the plurality of wrist parts and each configured for connecting one end of a corresponding one of the plurality of wrist parts with the inner side retaining part;
    a plurality of outer side connecting parts, prolonged from the outer side retaining part to the plurality of wrist parts and each configured for connecting the other end of a corresponding one of the plurality of wrist parts with the outer side retaining part; and
    a plurality of spoke parts for connecting the inner side retaining part with the outer side retaining part in a releasable manner;
    wherein at lease one of the plurality of spoke parts includes:
    at least one first spoke part; and
    at least two second spoke parts;
    wherein one end of each first spoke part is connected with the inner side retaining part, one end of each second spoke part is connected with the outer side retaining part, and the other end of each first spoke part is connected with the other ends of the at least two second spoke parts on the outer side of the outer side retaining part.

2. The lens driving device according to claim 1, wherein groove cutting parts are formed near the other end of each first spoke part and the other ends of the at least two second spoke parts projected on the outer side of the outer side retaining part.

* * * * *